(12) United States Patent
Russ

(10) Patent No.: US 9,205,928 B2
(45) Date of Patent: Dec. 8, 2015

(54) RAM AIR TURBINE STARTUP

(71) Applicant: HAMILTON SUNDSTRAND CORPORATION, Windsor Locks, CT (US)

(72) Inventor: David Everett Russ, Rockford, IL (US)

(73) Assignee: ROSEMOUNT AEROSPACE, INC., Burnsville, MN (US)

(*) Notice: Subject to any disclaimer, the term of this patent is extended or adjusted under 35 U.S.C. 154(b) by 0 days.

(21) Appl. No.: 14/480,008

(22) Filed: Sep. 8, 2014

(65) Prior Publication Data

US 2015/0064006 A1 Mar. 5, 2015

Related U.S. Application Data

(62) Division of application No. 12/939,760, filed on Nov. 4, 2010, now Pat. No. 8,876,474.

(51) Int. Cl.

| | |
|---|---|
| *B64C 11/34* | (2006.01) |
| *B64C 11/36* | (2006.01) |
| *B64D 41/00* | (2006.01) |
| *B64C 11/32* | (2006.01) |
| *F02C 7/32* | (2006.01) |
| *F03D 9/00* | (2006.01) |
| *B64C 11/30* | (2006.01) |

(52) U.S. Cl.
CPC ............ *B64D 41/007* (2013.01); *B64C 11/303* (2013.01); *B64C 11/325* (2013.01); *B64C 11/34* (2013.01); *B64C 11/343* (2013.01); *B64C 11/36* (2013.01); *F02C 7/32* (2013.01); *F03D 9/00* (2013.01); *F05D 2220/34* (2013.01); *F05D 2260/56* (2013.01); *F05D 2260/74* (2013.01); *F05D 2260/75* (2013.01); *F05D 2260/76* (2013.01); *F05D 2260/77* (2013.01); *F05D 2260/79* (2013.01); *F05D 2260/85* (2013.01); *Y02E 10/72* (2013.01); *Y02T 50/671* (2013.01)

(58) Field of Classification Search
CPC ...... B64C 11/303; B64C 11/32; B64C 11/34; B64C 11/36; B64C 11/325; B64C 11/343; B64D 41/007; F02C 7/32; F05D 2260/56; F05D 2220/34; F05D 2260/74; F05D 2260/75; F05D 2260/77; F05D 2260/85
USPC ............... 416/46, 50–53, 137, 138, 140, 151, 416/153, 163–165, 167
See application file for complete search history.

(56) References Cited

U.S. PATENT DOCUMENTS

| | | |
|---|---|---|
| 4,411,596 A | 10/1983 | Chilman |
| 4,671,737 A | 6/1987 | Whitehouse |
| 4,701,104 A | 10/1987 | Cohen |
| 4,743,163 A | 5/1988 | Markunas et al. |
| 4,762,294 A | 8/1988 | Carl |
| 5,249,924 A | 10/1993 | Brum |
| 5,487,645 A * | 1/1996 | Eccles .............................. 416/51 |
| 5,562,417 A | 10/1996 | Grimm et al. |
| 7,306,430 B2 | 12/2007 | Russ |

(Continued)

FOREIGN PATENT DOCUMENTS

| | | |
|---|---|---|
| EP | 2199205 A2 | 6/2010 |
| GB | 2072271 A | 9/1981 |
| WO | 8703332 A1 | 6/1987 |

*Primary Examiner* — Christopher Verdier
(74) *Attorney, Agent, or Firm* — Cantor Colburn LLP

(57) ABSTRACT

A ram air turbine (RAT) in which a cam follower is operably coupled to turbine blades such that a cam follower position determines turbine blade pitch.

7 Claims, 25 Drawing Sheets

(56) References Cited

U.S. PATENT DOCUMENTS

| | | |
|---|---|---|
| 2006/0078430 A1 | 4/2006 | DeGroff |
| 2006/0239817 A1 | 10/2006 | Norh |
| 2006/0263220 A1 | 11/2006 | Russ |
| 2006/0280603 A1 | 12/2006 | Bannon |
| 2010/0158698 A1 | 6/2010 | Russ et al. |
| 2010/0266404 A1 | 10/2010 | Bannon |
| 2013/0287569 A1 | 10/2013 | Bannon |

* cited by examiner

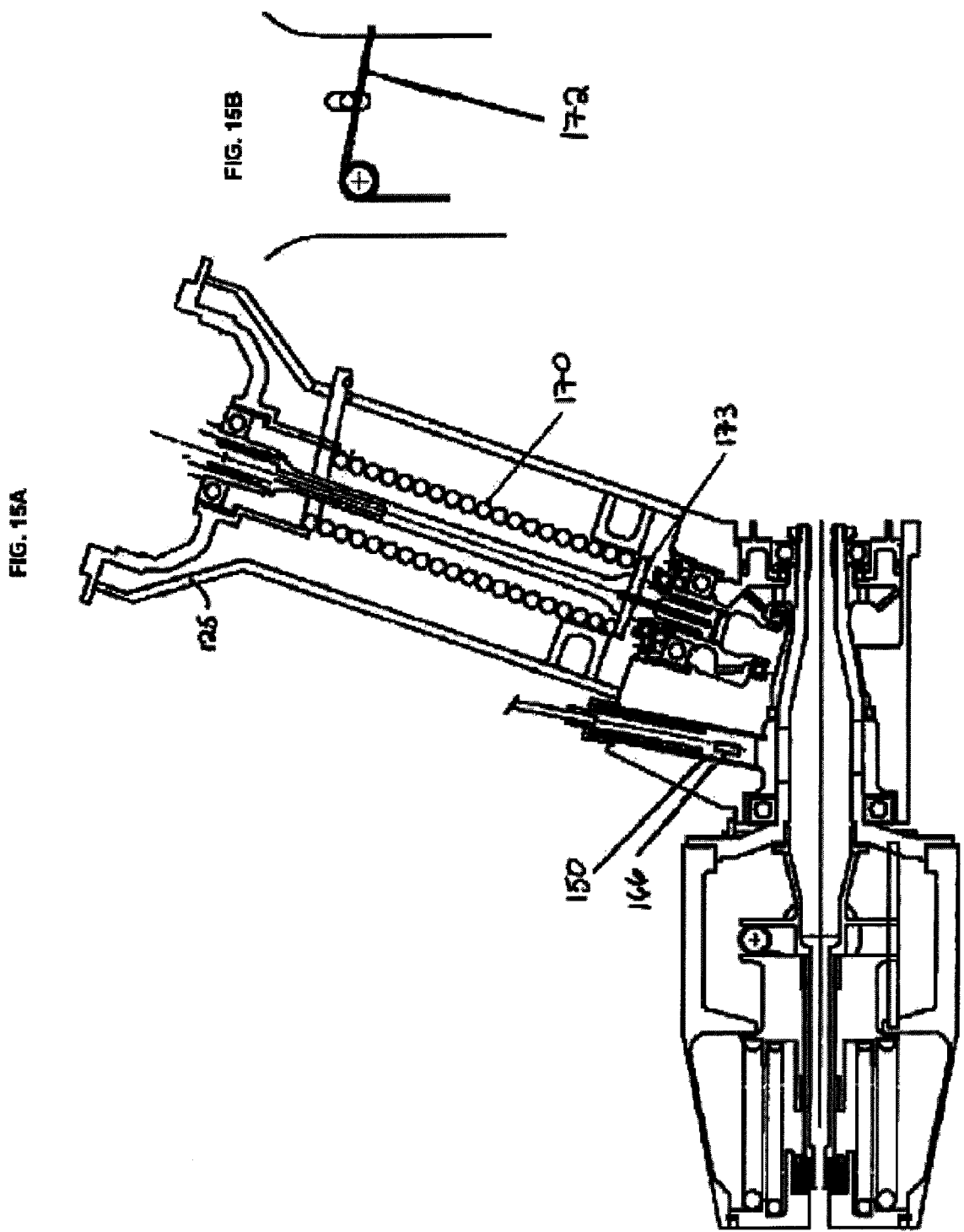

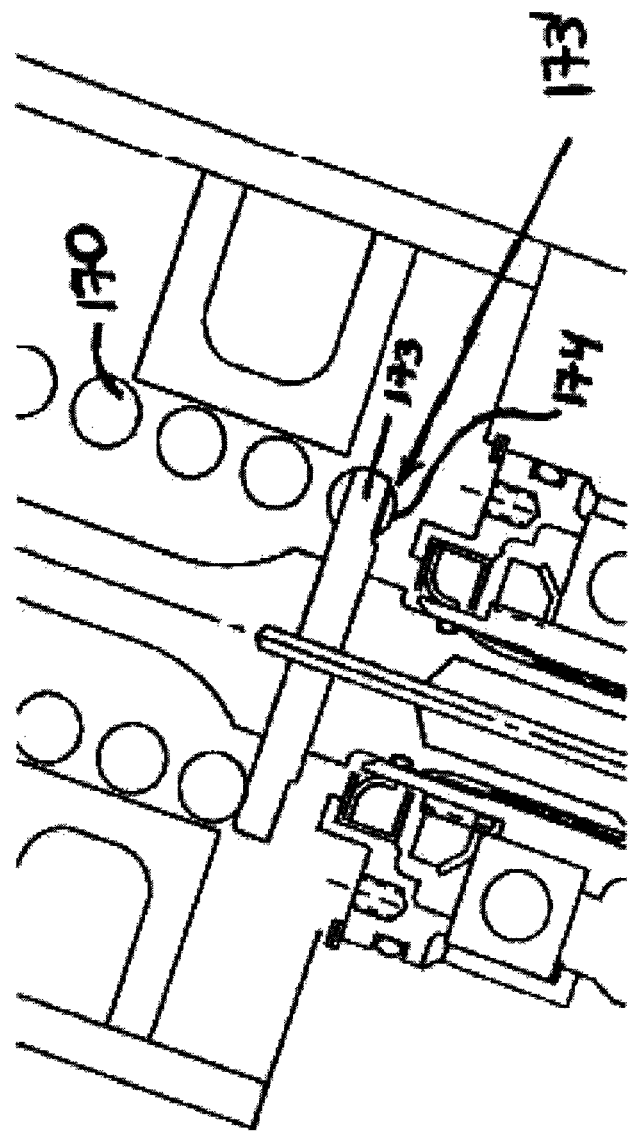

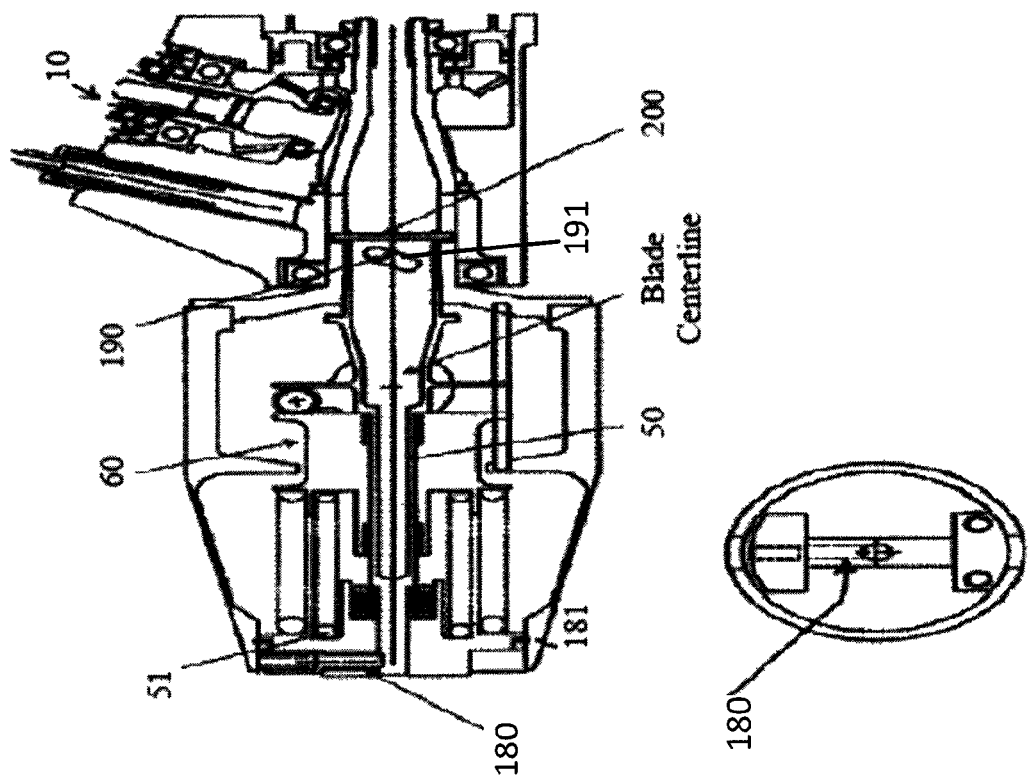
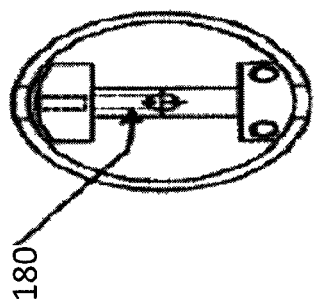

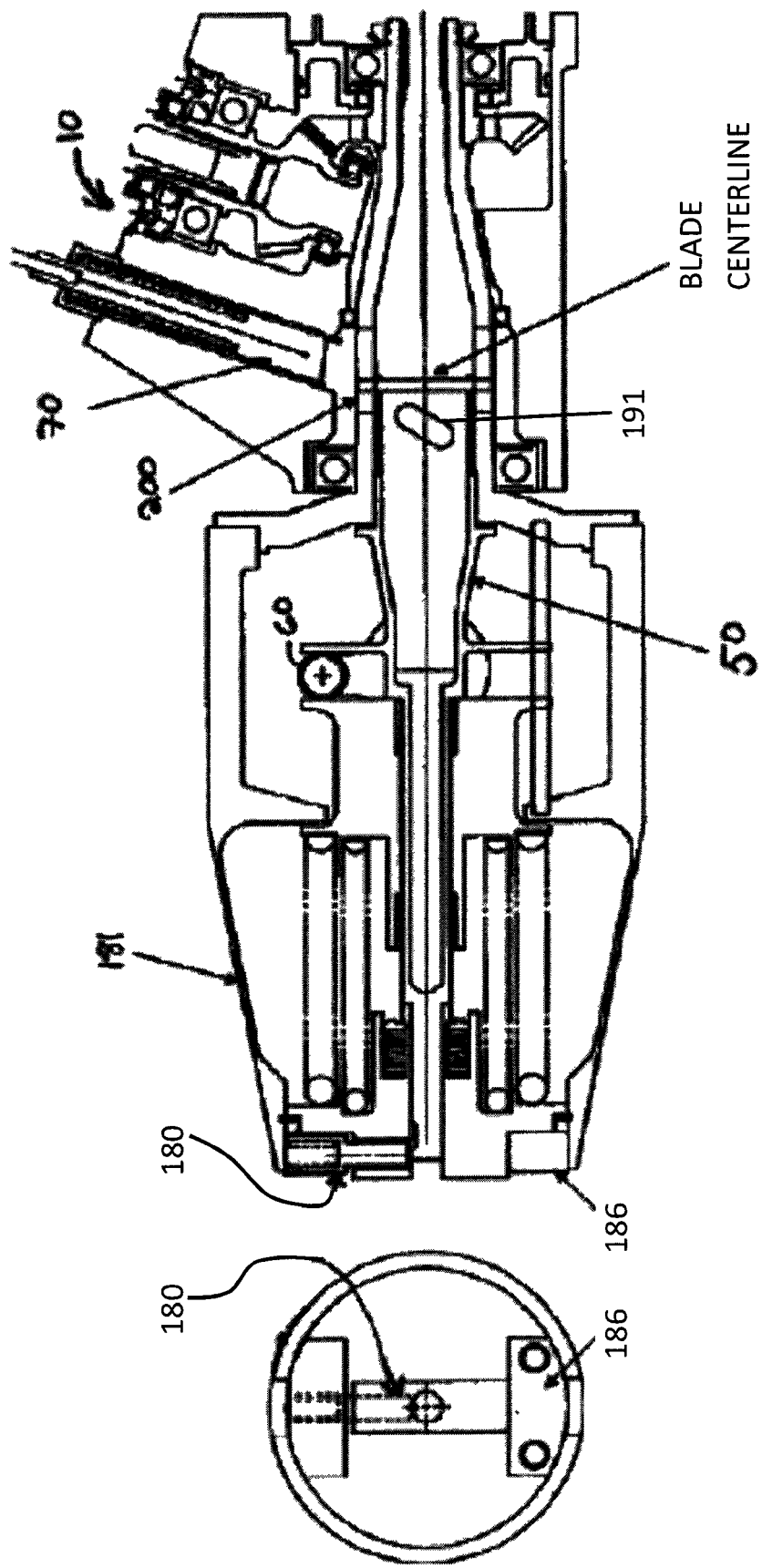

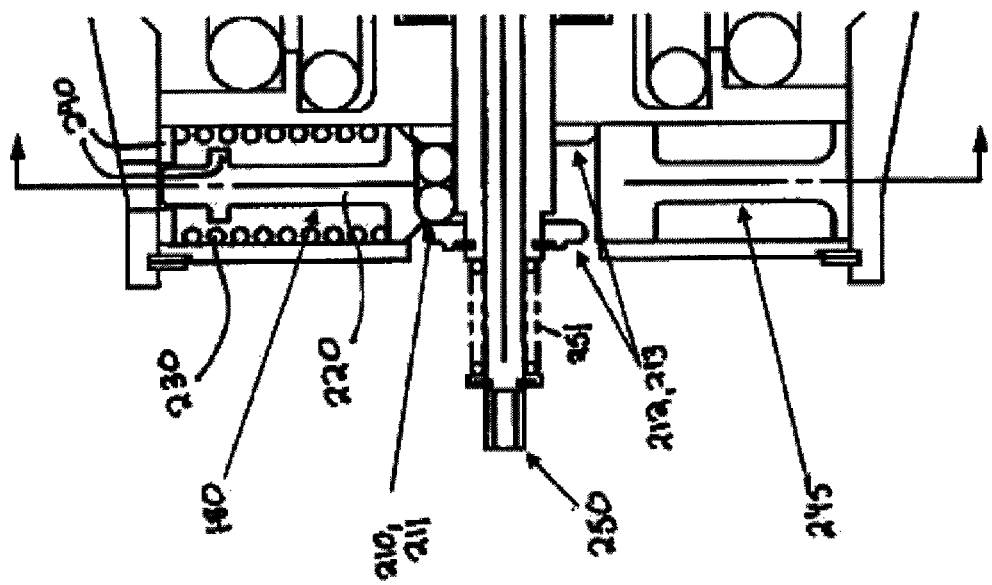
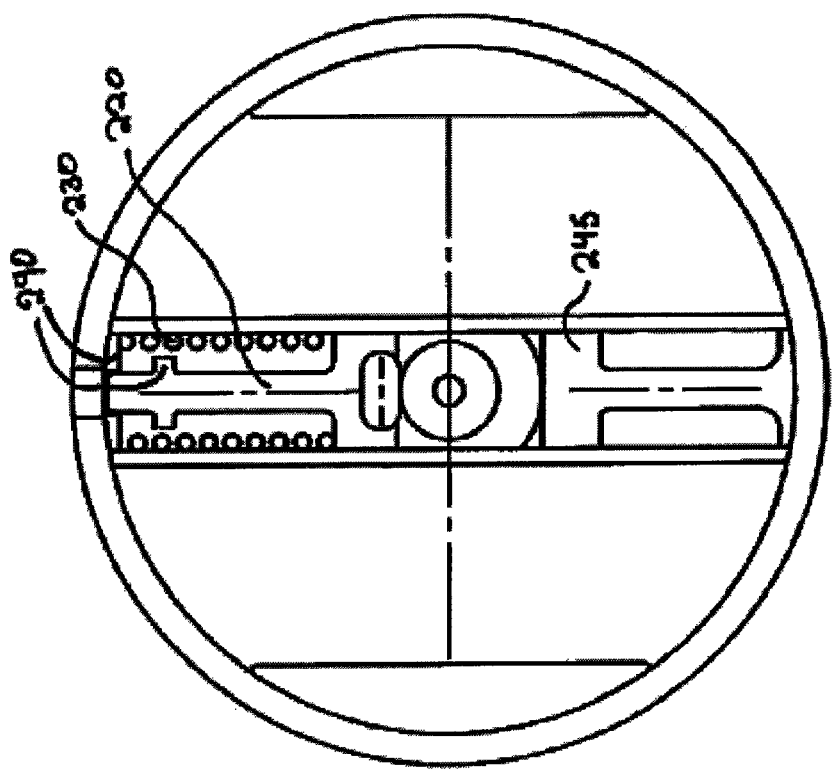

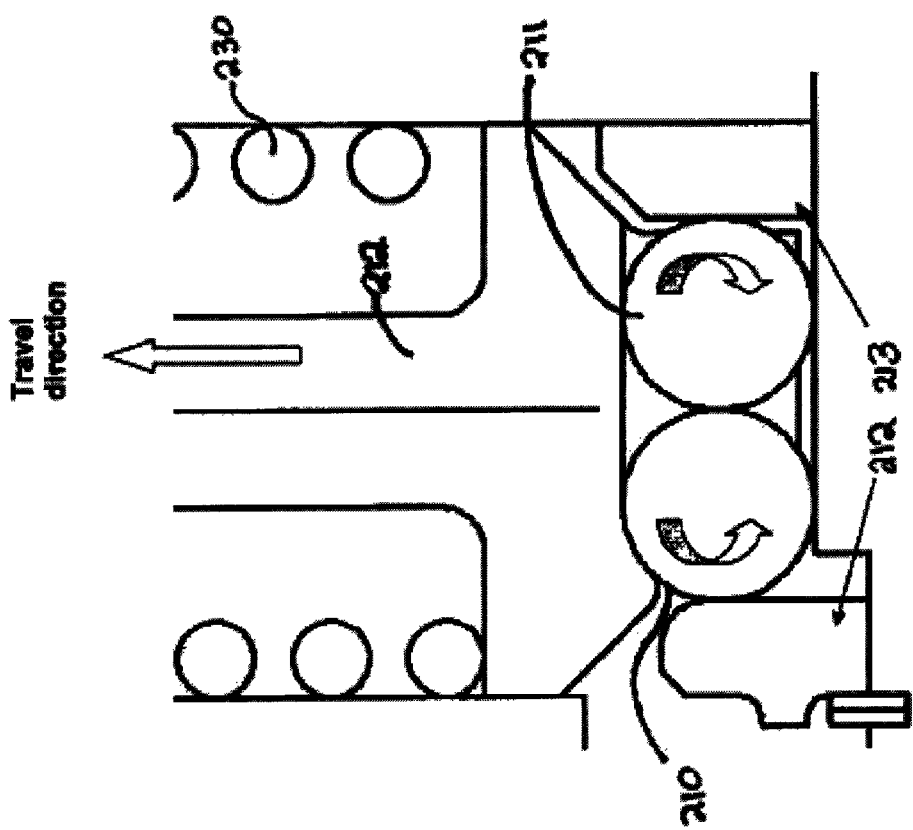

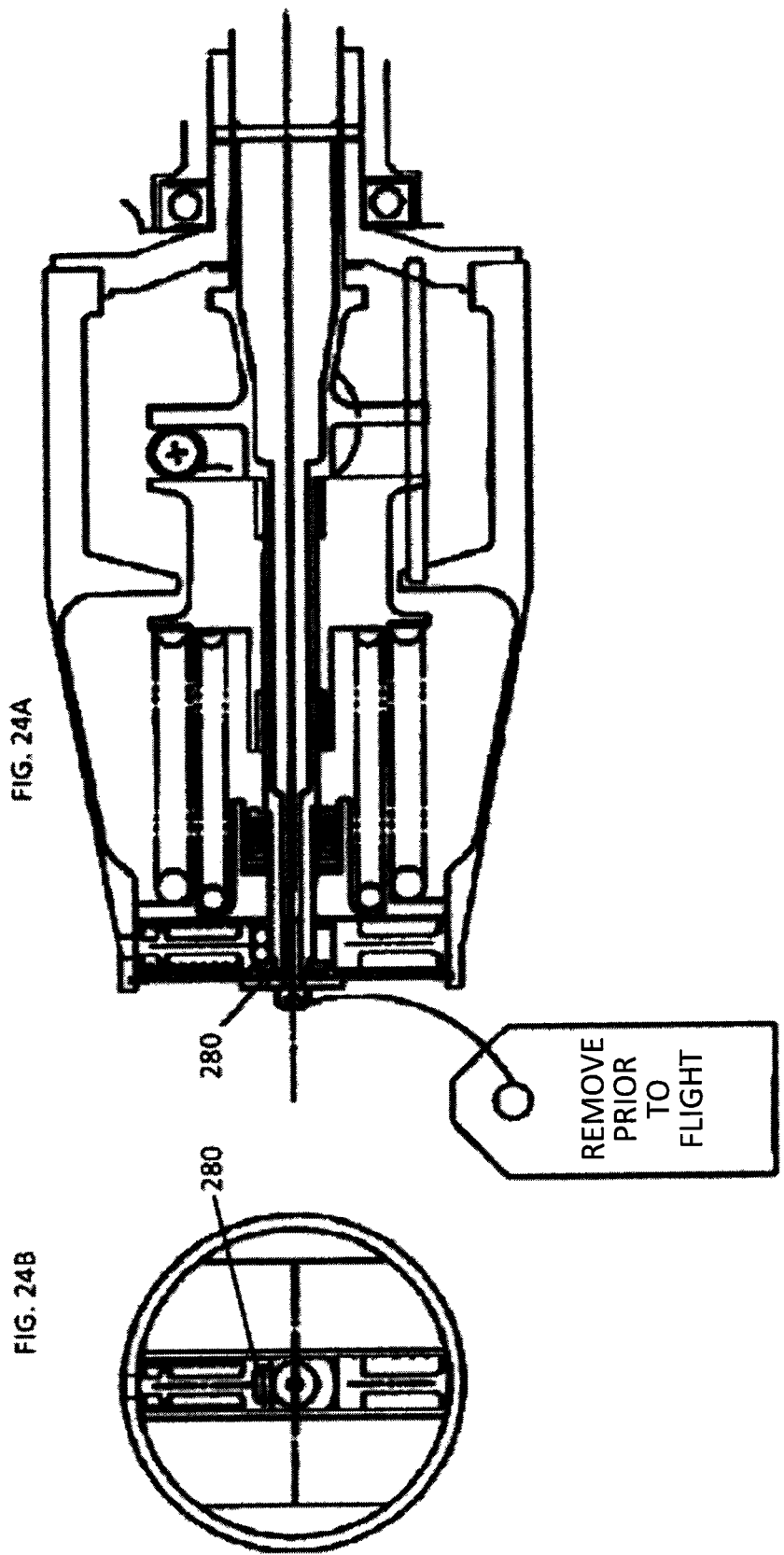

RAM AIR TURBINE STARTUP

CROSS REFERENCE TO RELATED APPLICATION

This application is a Divisional Application that claims the benefit of priority to U.S. application Ser. No. 12/939,760, which was filed on Nov. 4, 2010 and is now issued as U.S. Pat. No. 8,876,474. The entire disclosures of U.S. application Ser. No. 12/939,760 are incorporated herein by reference.

BACKGROUND OF THE INVENTION

The subject matter disclosed herein relates to improvements to RAT startup.

A Ram Air Turbine (RAT) is controlled by a governing mechanism to maintain a narrow operating speed range. The governor spring and blade aerodynamic forces rotate the blades toward fine pitch orientations at which substantially rapid rotation occurs with blade faces oriented substantially perpendicularly with respect to the airstream. Blade counterweights rotate the blade toward coarse pitch to prevent over speed conditions. The various forces of the governor spring, the blade aerodynamics and the blade counterweights balance each other to maintain the proper speed range but the counterweights require centrifugal forces to develop their restraining forces.

During startup, centrifugal forces are low, so the RAT governor is typically controlled by the governor springs with the blades in the fine pitch position. The airfoil shape is optimized to give power over the operating speed range, so it is somewhat inefficient at low RPM and fine pitch and there is very little torque available to overcome the large blade inertia and the RAT tare losses at low RPMs. Indeed, even if the RAT starts to turn, it takes a long time for a fine pitch RAT to get up to operating speed. Moreover, RATs are sometimes placed in turbulent zones under the aircraft where the dynamic pressure loss is high. This further reduces the available torque for start up.

Both fine pitch and coarse pitch start up RATs are currently in production. The fine pitch architecture has proven superior for reliability, robustness, weight, cost and packaging. Coarse pitch RATs contain more heavy, complicated parts and more failure points, but they start up more efficiently.

BRIEF DESCRIPTION OF THE INVENTION

According to one aspect of the invention, a ram air turbine (RAT) in which a cam follower is operably coupled to turbine blades such that a cam follower position determines turbine blade pitch is provided and includes an axially movable governor shaft having an end axially abutting a nut, a post having threading and a thread relief, the threading engaging with the nut when the post occupies a nut engagement position and the threading disengaging from the nut when the post is moved to a nut disengagement position and a system operably coupled to the governor shaft and the post whereby, prior to start up, the post selectively occupies the nut engagement position and is manually rotatable in a first direction to move the governor shaft in a first axial direction such that the cam follower is positioned at a first position favorable for start up, and, as RPMs increase from zero due to airstream flow, the post is automatically rotatable in a second direction to move the governor shaft in a second axial direction such that the cam follower is positioned at second positions.

According to another aspect of the invention, a ram air turbine (RAT) in which a cam follower is operably coupled to turbine blades such that a cam follower position determines turbine blade pitch is provided and includes an axially movable governor shaft having an end axially abutting a nut, a post having threading that engages with the nut and a screw driving feature, a handle having an end that is engageable with the screw driving feature when the handle occupies an engagement position and disengageable from the nut when the handle occupies a disengagement position and a system operably coupled to the governor shaft and the post whereby, prior to start up, the handle selectively occupies the engagement position and is manually rotatable in a first direction to move the governor shaft in a first axial direction such that the cam follower is positioned at a first position, and, as RPMs increase from zero due to airstream flow, the post is automatically rotatable in a second direction to move the governor shaft in a second axial direction such that the cam follower is positioned at second positions favorable for start up.

According to another aspect of the invention, a startup assistance apparatus for a ram air turbine (RAT) is provided and includes a shaft having threading over a partial length thereof, a nut disposed on the shaft to travel back and forth between a beginning of the partial length, an end of the partial length and a remote position remote from the partial length, an elastic element to bias the nut towards the remote position, a lever operably coupled to the nut to selectively move the nut from the remote position to the end of the partial length against the elastic element bias and a system by which the nut provides the RAT with first direction blade rotation assistance while traveling from the beginning to the end of the partial length and second direction blade rotation of the RAT selectively moves the nut from the end to the beginning of the partial length against the elastic element bias.

According to another aspect of the invention, a startup assistance apparatus for a ram air turbine (RAT) is provided and includes a first elastic element having a ledge at an end thereof, a retention pin to which the ledge is connectable, a second elastic element coupled to the first elastic element and configured to selectively occupy a first orientation at which the first elastic element is biased such that the ledge is retracted from the retention pin and a second orientation at which the ledge is temporarily coupled to the retention pin and a system by which first direction blade rotation of the RAT loads the first elastic element with the ledge temporarily coupled to the retention pin and an unloading of the first elastic element provides second direction blade rotation assistance to the RAT via the retention pin.

According to yet another aspect of the invention, a ram air turbine (RAT) in which a cam follower is operably coupled to turbine blades such that a cam follower position determines turbine blade pitch is provided and includes a turbine hub formed to define a tubular interior, an axially movable governor shaft disposed within the tubular interior and having an end in which a groove is defined, the governor shaft being biased to move from a first position to a second position, a latch pin anchored on the turbine hub and biased to engage with the groove to maintain the governor shaft in the first position and a system operably coupled to the governor shaft and the latch pin whereby, at start up, the latch pin engages with the groove to maintain the governor shaft in the first position such that the cam follower is positioned at a first position favorable for start up, and, as RPMs increase from zero due to airstream flow, the latch pin is urged to disengage from the groove such that the governor shaft is permitted to move toward the second position and the cam follower is positioned at second positions.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 15A, 15B and 15C are side sectional and enlarged views of the assembly of FIGS. 14A and 14B with a spring shifted down into a wind up position;

FIG. 16A is a side sectional view of an RAT in accordance with alternative embodiments in start up position;

FIG. 16B is an axial view of the RAT illustrated in FIG. 16A;

FIG. 17A is a side sectional view of an RAT in accordance with alternative embodiments in operation position;

FIG. 17B is an axial view of the RAT illustrated in FIG. 17A;

FIGS. 20A, 20B and 21 are enlarged views of a latch pin of FIG. 19;

FIG. 24A is a side sectional view of the RAT of FIG. 19 in accordance with alternative reset embodiments; and FIG. 24B is an axial view of the RAT illustrated in FIG. 24A.

The detailed description explains embodiments of the invention, together with advantages and features, by way of example with reference to the drawings.

DETAILED DESCRIPTION OF THE INVENTION

In accordance with aspects of the invention, a construction of a fine pitch ram air turbine (RAT) 10 is provided with enhancements needed to make the RAT startup process more efficient even under adverse conditions. These enhancements include a coarse pitch start mechanism that rotates the blades to a mid-range pitch only during startup to thereby provide additional torque needed to aid startup.

Figure 1:
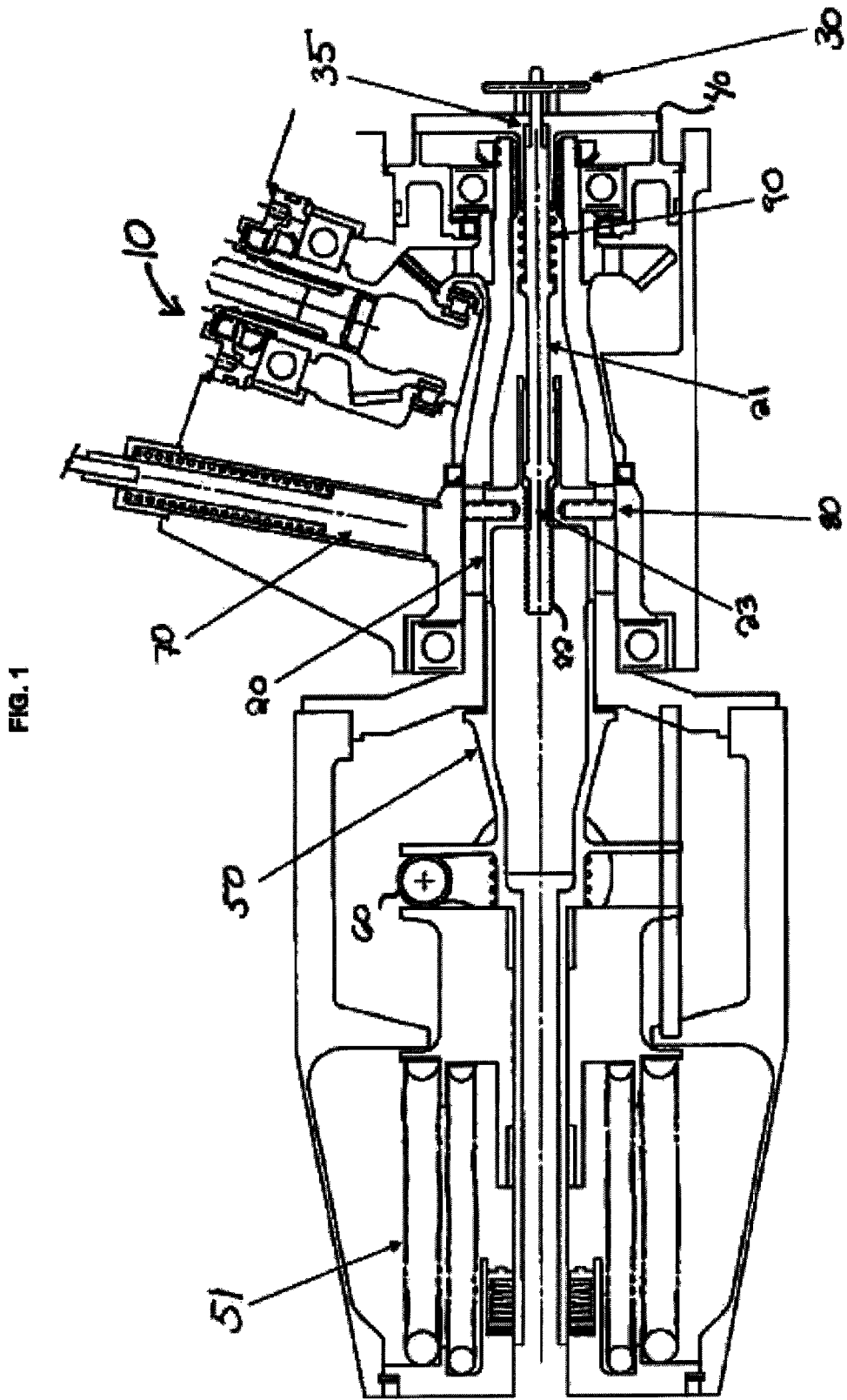
FIG. 1 is a side sectional view of a fine pitch RAT with a thread feature to aid start up in a fine pitch position in a normal operation position.

With reference to FIGS. 1, 2, 4 and 5, the RAT 10 includes a nut 20 and a threaded post 21 having screw threads 22 extending along a partial length thereof. The nut 20 and the threaded post 21 are shown in FIG. 1 with the RAT 10 in the normal operation position where the turbine is in fine pitch for maximum power from an airstream. The threaded post 21 includes a thread relief 23 where the screw threads 22 have a small diameter section and do not engage with the nut 20. The nut 20 therefore rotates freely within the thread relief 23 of the threaded post 21 so that the turbine is free to govern normally.

Figure 5:
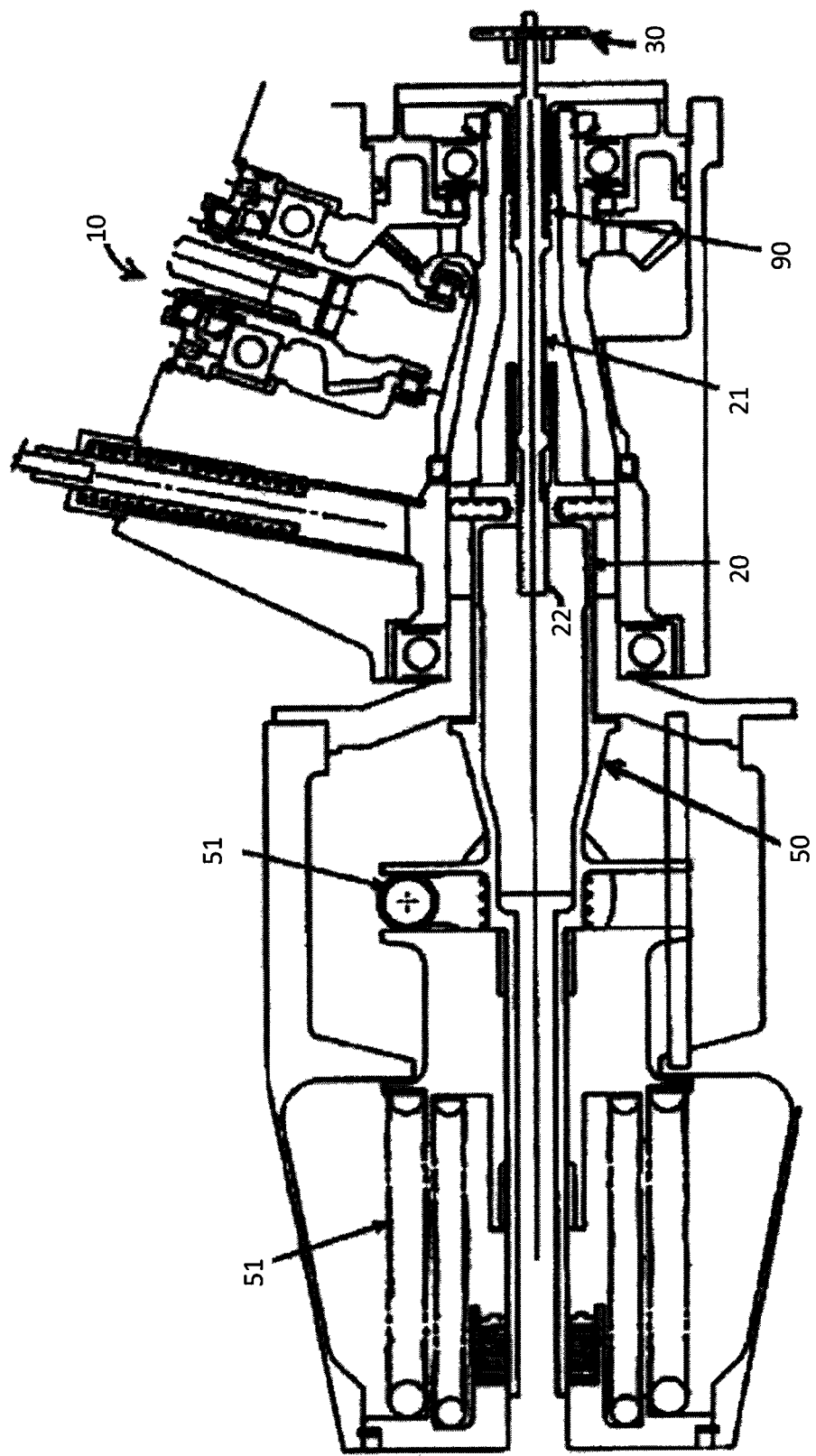
FIG. 5 is a side section view of a RAT during the wind up procedure

When the RAT 10 is fully deployed with the aircraft on the ground and it is time to stow the RAT 10, the handle 30 is pulled by an operator (i.e., it is moved to the right relative to the image of FIG. 1) until the screw threads 22 contact the nut 20. The turbine blades are then rotated by hand in a first direction to engage the nut 20 and the screw threads 22 while the gap 35, shown in FIG. 1 between the threaded post 21 and the cover 40, allows multiple screw threads 22 to be engaged prior to the first direction blade rotation encountering a significant load. After the gap 35 is closed, as shown in FIG. 5, further rotation of the turbine blades pushes the nut 20 against the governor shaft 50 to compress the governor springs 51. The governor shaft 50 thus moves from the FIGS. 1 and 5 position to the FIG. 2 position, which causes the cam follower 60 to be repositioned and to rotate the turbine blades to a coarse pitch start up position.

Figure 2:
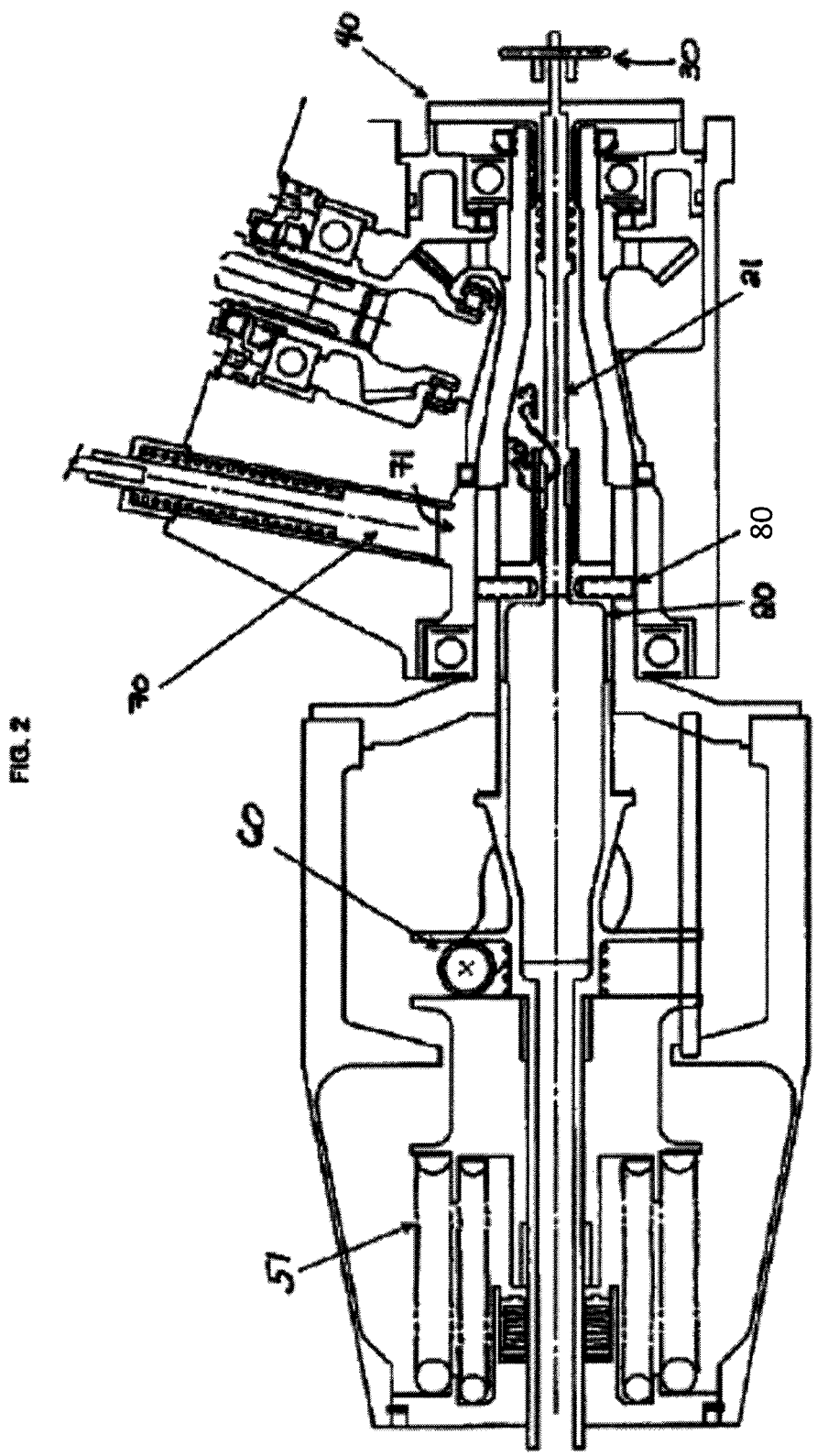
FIG. 2 is a side sectional view of a fine pitch RAT with a thread feature to aid start up in a coarse pitch startup position.

The threaded post 21 is loaded axially by the governor springs 51 during windup from the FIG. 5 position to the FIG. 2 position so no further hand pressure is needed on the handle 30 after the nut 20 and the screw threads 22 are engaged. An antirotation feature exists between post 21 and cover 40 to prevent screw rotation. Also, once the full coarse pitch position is reached, higher resistance is encountered as a signal to stop rotating. A mark could also be placed on the end of the governor shaft 50, if desired, for an additional visual aid to indicate the stop rotating position. The screw threading selected would generally be fine enough to prevent the blades from rotating backwards, so the blades may be safely released at any time during the wind up procedure.

The RAT 10 is stowed in the FIG. 2 coarse pitch position at which the turbine release pin 70 engages into a slot 71 (not particularly shown). Set screws 80 located in the nut 20 are shifted out of the path of the turbine release pin 70 only in the coarse pitch position of FIG. 2. These set screws 80 prevent the turbine release pin 70 from dropping into the slot 71 unless the coarse pitch position is effected. As such, the device is fool proofed against a forgetful operator.

When the RAT 10 is initially deployed into an airstream, coarse pitch positioned turbine blades develop significantly more torque than fine pitch positioned turbine blades. As the turbine blades rotate, the nut 20 moves down the threading of the threaded post 21 to gradually change the blades from coarse to fine pitch. The thread pitch is selected to ensure that the turbine maintains a coarser pitch until sufficient speed is built up. Too coarse a thread will allow fine pitch to occur at a low RPM before sufficient torque margin is built up and too fine a thread would allow the blades to operate at a non-optimal blade position, which also does not develop as much torque to slow down the startup time. Calculations on an example RAT showed the best start times at about 28 threads per inch although adequate startups could occur anywhere from 8 threads per inch to 64 threads per inch.

Figure 3:
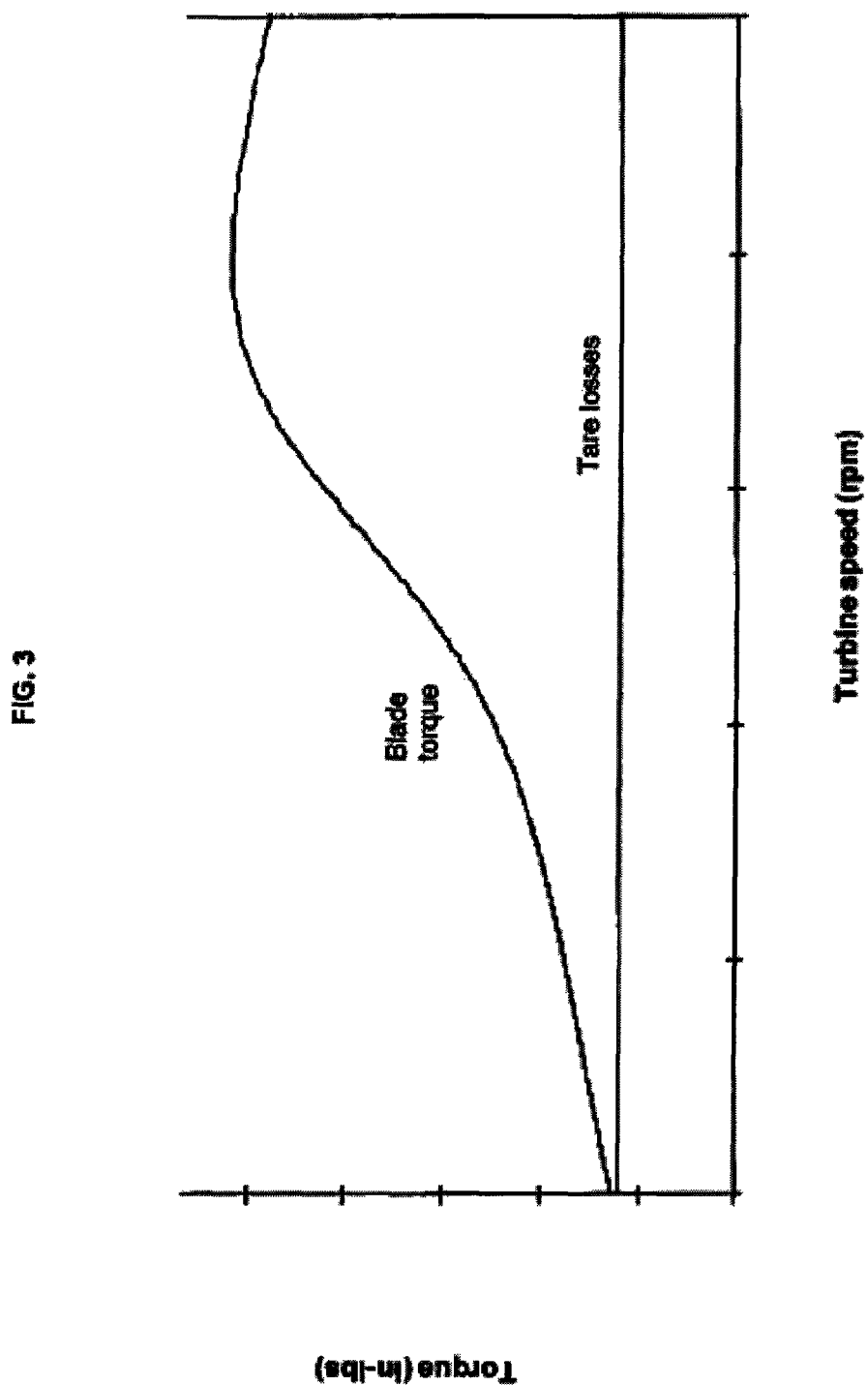
FIG. 3 is a graphical illustration of torque vs. turbine speed for a traditional fine pitch start up RAT.
Figure 4:
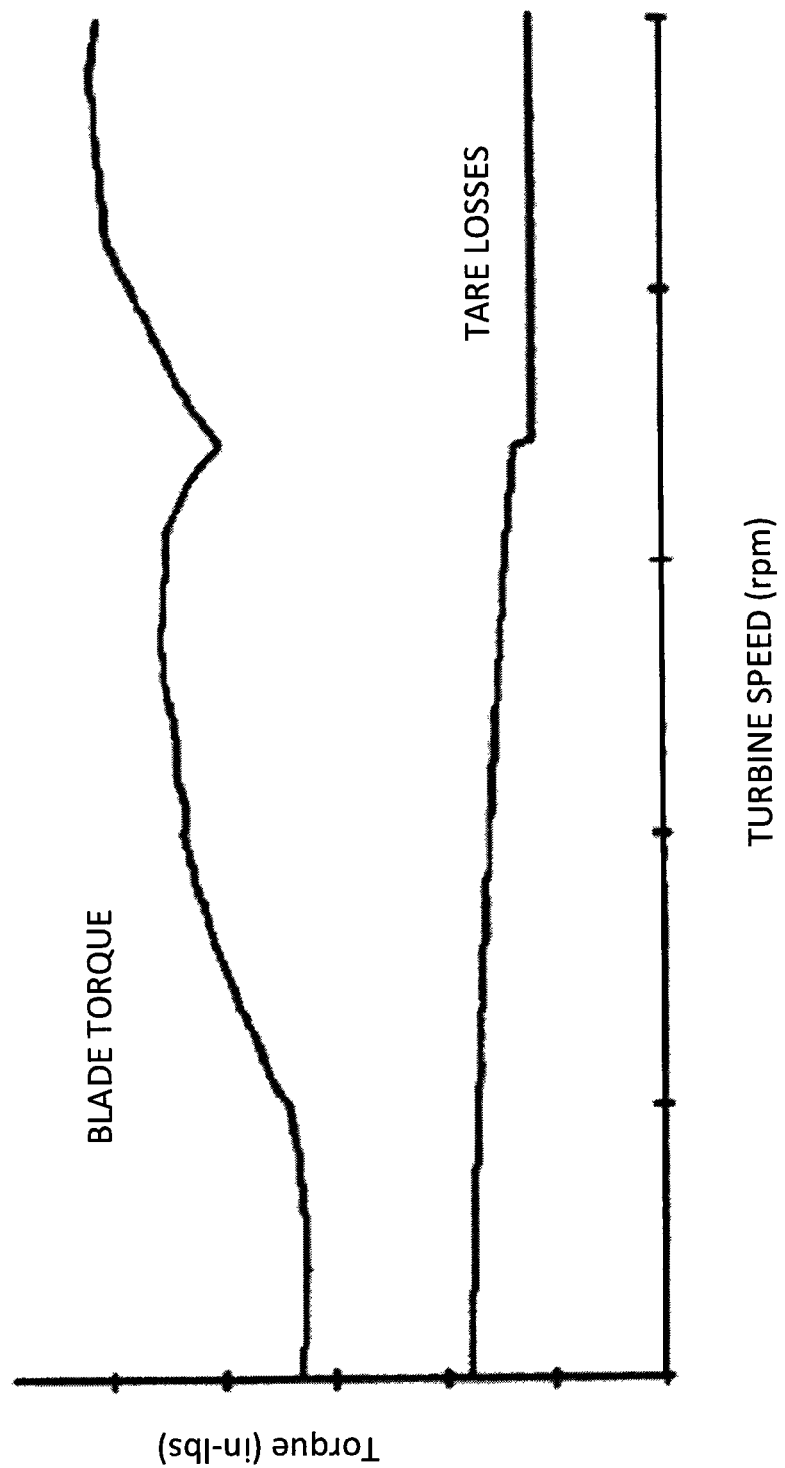
FIG. 4 is a graphical illustration of torque vs. turbine speed with the threaded feature to improve start up included.

With reference to FIGS. 3 and 4, improvements made possible using this method are shown in that a turbine will spin up quickly if blade torque is significantly higher than drag torque. A typical fine pitch startup RAT 10, as shown in FIG. 3, has little torque margin at low RPMs, for a very slow startup under these conditions. The fine pitch blade angle is often adjusted higher to aid startup, which compromises available power during normal operation. For example, as shown in FIG. 3, fine blade pitch was adjusted higher just to obtain positive startup torque margin, which would reduce performance during operation. The varying blade angle used for FIG. 4, however, allows the turbine blade to be near its peak torque producing angle throughout startup without compromising performance. At about 1700 RPM in FIG. 4, the turbine has reached fine pitch, so normal governing occurs for the rest of spin up at this airspeed.

A relatively small pitch diameter thread is best to minimize friction torque, which impedes startup. As shown in FIG. 4, tare loss is higher when the threading is engaged, but the added blade torque is sufficient to overcome the additional tare losses.

With reference to FIG. 5, the RAT 10 is shown at the moment that fine pitch is reached during a startup. Sufficient numbers of screw threads 22 are still engaged with the nut 20 to carry the governor spring 51 load just prior to fine pitch. Once fine pitch position is reached, the nut 20 stops moving axially but continues to rotate and draws the threaded post 21 towards the governor springs 51 (i.e., to the left in the image) under the light post spring 90 load until the nut threads run off into the thread relief 23. The post spring 90 extends to keep the threaded post 21 from contacting the nut 20 during normal RAT 10 operation, which leaves the RAT 10 in the FIG. 1 orientation again.

The thread form and screw and nut materials are important variables that may change with the service requirements of the RAT 10. For a small number of deployments and restows, the V-shaped threads shown should provide adequate life. For higher numbers of restows, an acme, square or buttress tooth form may be chosen to minimize thread wear. A grease reservoir 20' as shown best in FIG. 2 may also be provided to keep the threads free of contamination and provide adequate lubrication. The cover 40 and the threaded post 21 must be removed during periodic RAT 10 maintenance checks, so fresh lubricant may be applied during each check.

Figure 6:
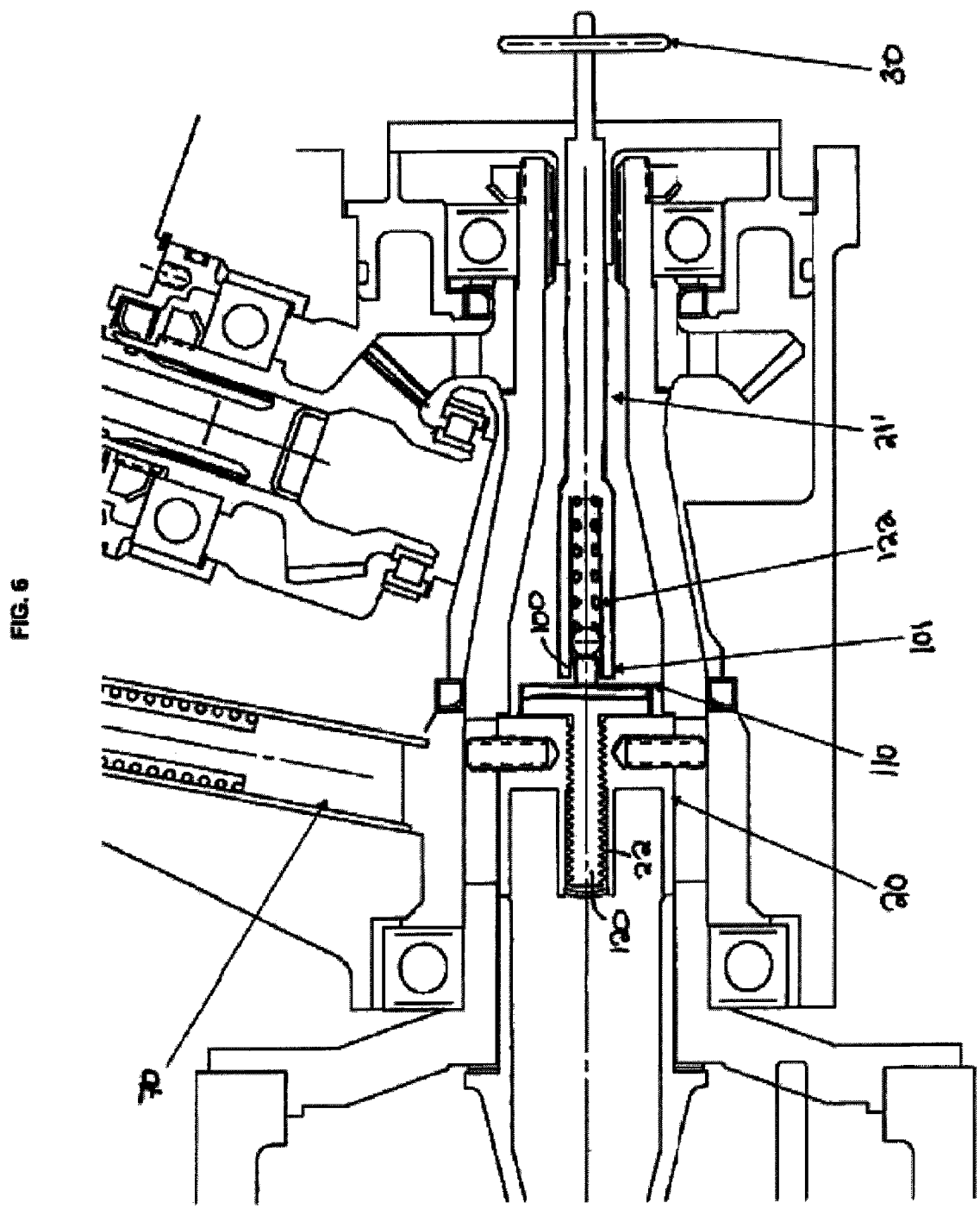
FIGS. 6, 7 and 8 are side sectional views of an RAT in the operating position, the start of wind up and the start up position in accordance with an alternate embodiment.
Figure 7:
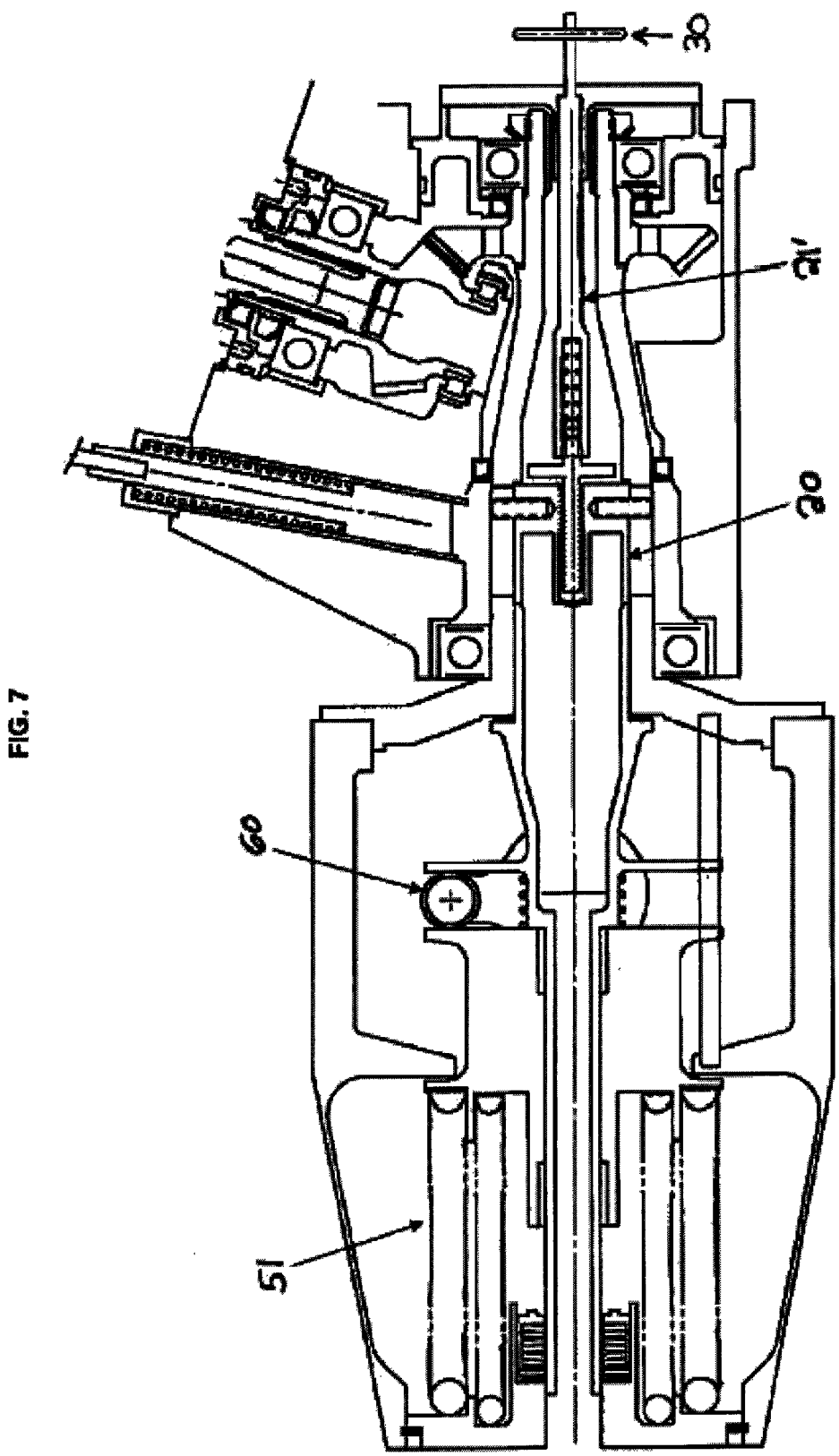
Figure 8:
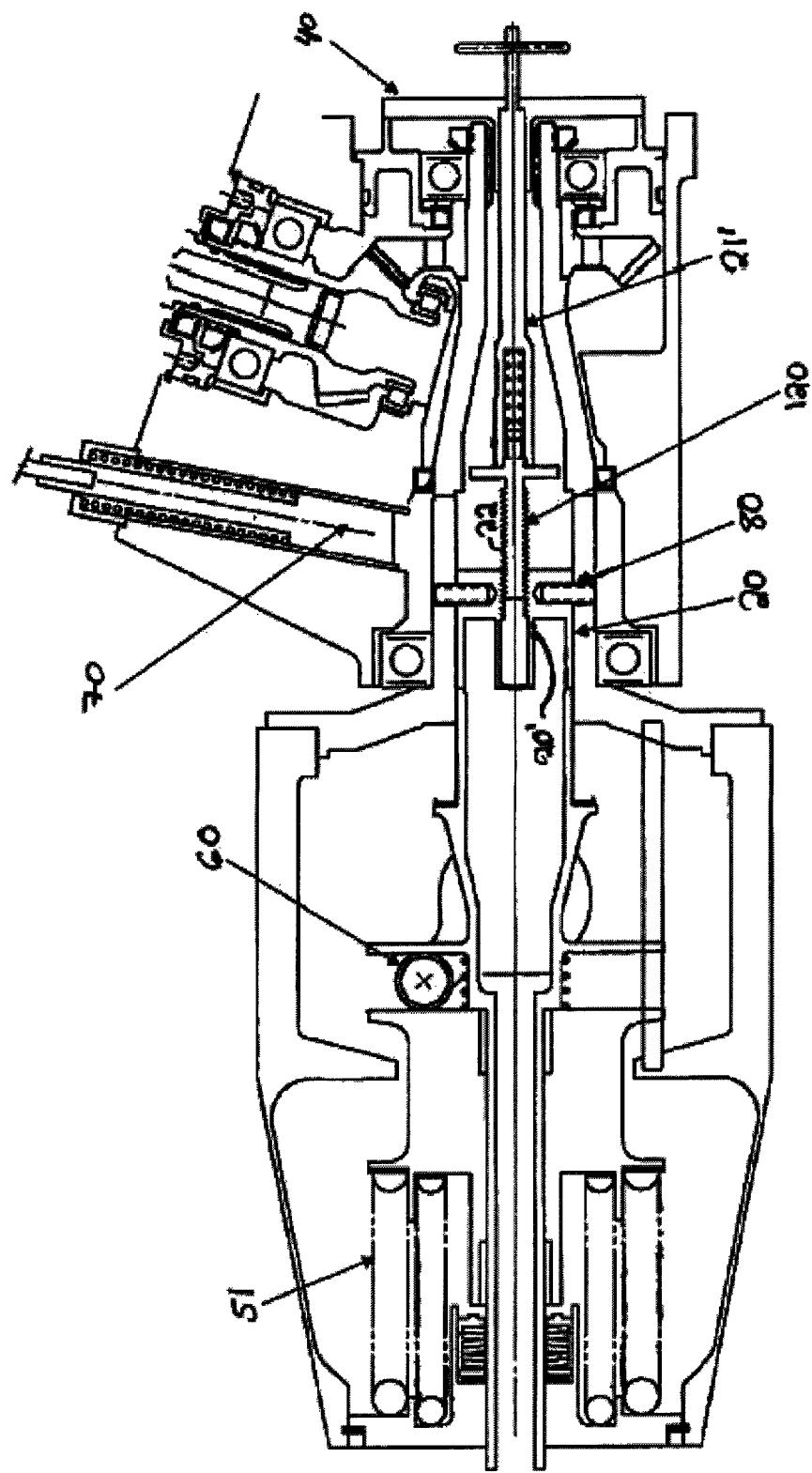

In accordance with further embodiments and, with reference to FIGS. 6 7 and 8 the threaded post 21 may be split into post 21' and screw 120. The screw threads 22 of the screw 120 remain engageably threaded within the nut 20 since thread disengagement is not required and a slightly smaller screw pitch diameter may be used to achieve a better torque margin between tare losses and available torque. The slotted post 21', in this case, is also slightly easier to remove and reassemble during ground maintenance.

FIG. 6 shows the RAT 10 in the operating position. The screw and nut 20 rotate with the turbine. There is a slot 100 defined on an end 101 of the slotted post 21' that engages a screw driving feature 110 like a screwdriver in a slot to reset the mechanism. In operation, a gap exists between these features to allow for rotation.

To reset the mechanism on the ground, the handle 30 is pushed toward the governor springs 51 (i.e., to the left in the image) until the slotted end 101 contacts the screw driving feature 110. A partial rotation of the turbine blades allows the screw driving feature 110 and the slot 100 to engage. Then, the turbine blades are rotated through multiple revolutions until the blades are in coarse pitch position, as shown in FIG. 8. Set screws 80 in the nut 20 prevent the turbine release pin 70 engagement and stowing unless the blades are in the proper coarse pitch orientation.

When the RAT 10 is deployed and the turbine release pin 70 is retracted again, the nut 20 moves down the screw threads 22 to gradually change the blade pitch from coarse pitch to fine pitch (from FIG. 8 to FIG. 7). When the turbine blades achieves fine pitch, the nut 20 stops moving axially but continues to rotate. The screw 120 is drawn away from the screw driving feature 110 (i.e., to the left in the image) by the screw threads 22 until the slot 100 and the screw driving feature 110 disengage. A small flywheel may be built into the screw 120 as depicted, to provide increased inertia. This causes the screw 120 to continue to move to the left as the screw 120 accelerates from stationary up to the nut 20 speed. A spring and a ceramic ball assembly 122 is located inside the slotted post 21' and provides a light load to ensure that the screw 120 doesn't move back to the right from vibration during normal operation. Pin wear testing shows that for the limited life of a RAT 10, a rounded end pin could be substituted but a ceramic ball offers less potential to weld the parts together from friction heat.

A grease reservoir 20', best seen in FIG. 8, may be provided as an integral feature with the nut 20. It re-greases the screw 120 during each use and catches grease released by centrifugal force from the spinning screw 120. The post spring and ball also reside in a grease reservoir that provides re-lubrication for the ball.

The discussions about thread form and performance described in the first embodiment also apply to this embodiment.

Figure 9:
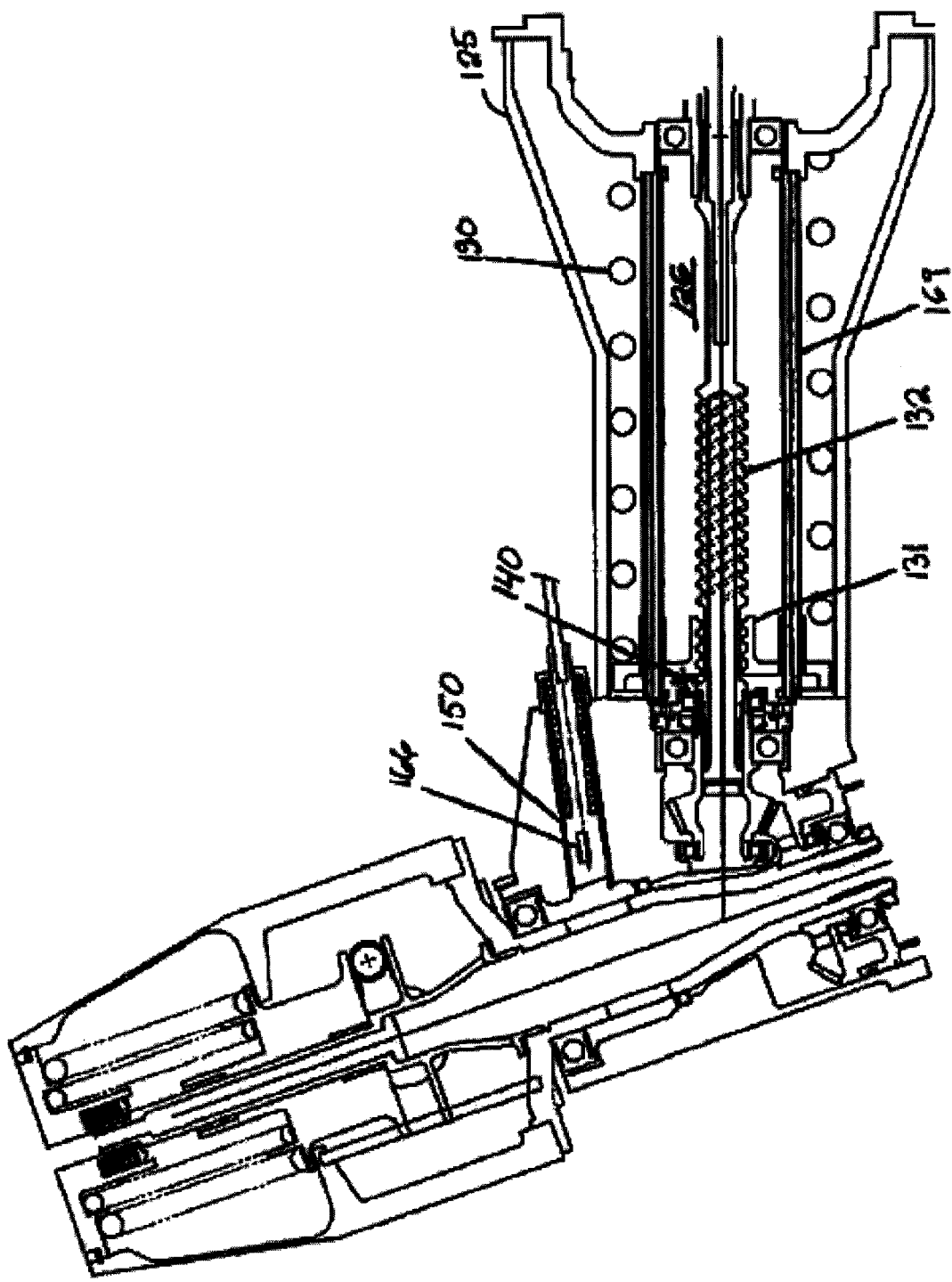
FIG. 9 is a side sectional view of an RAT start up assistance assembly for an alternative embodiment.

In accordance with further aspects of the invention and, with reference to FIG. 9-12, the RAT 10 is supported on an aircraft by a strut 125 that has an outer casing formed to define a tubular interior 126. A compression spring 130 is disposed in this tubular interior 126 and is illustrated as driving a nut 131 along a screw 132, such as an acme screw from the FIG. 11 position to the FIG. 9 position to assist with RAT 10 start up. As shown in FIG. 9, the compression spring 130 biases the nut 131 to move along the screw 132 from a beginning of the threading, to an end of the threading and then continuing toward a remote position. That is, the nut 131, such as an acme nut, is designed to run off the screw threads of the screw 132 at an end of a compression spring 130 travel distance to ensure that the RAT 10 is free to rotate during normal operation. Square threads or a ball screw may be substituted for acme threads if desired for slightly greater efficiency.

Figure 10:
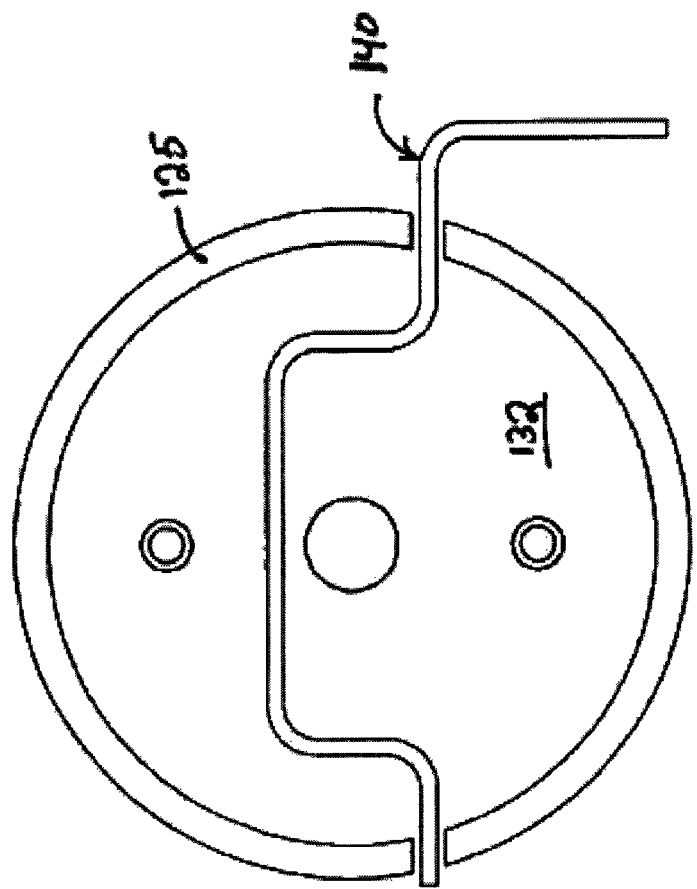
FIG. 10 is an axial view of a reset lever of the assembly of FIG. 9.
Figure 11:
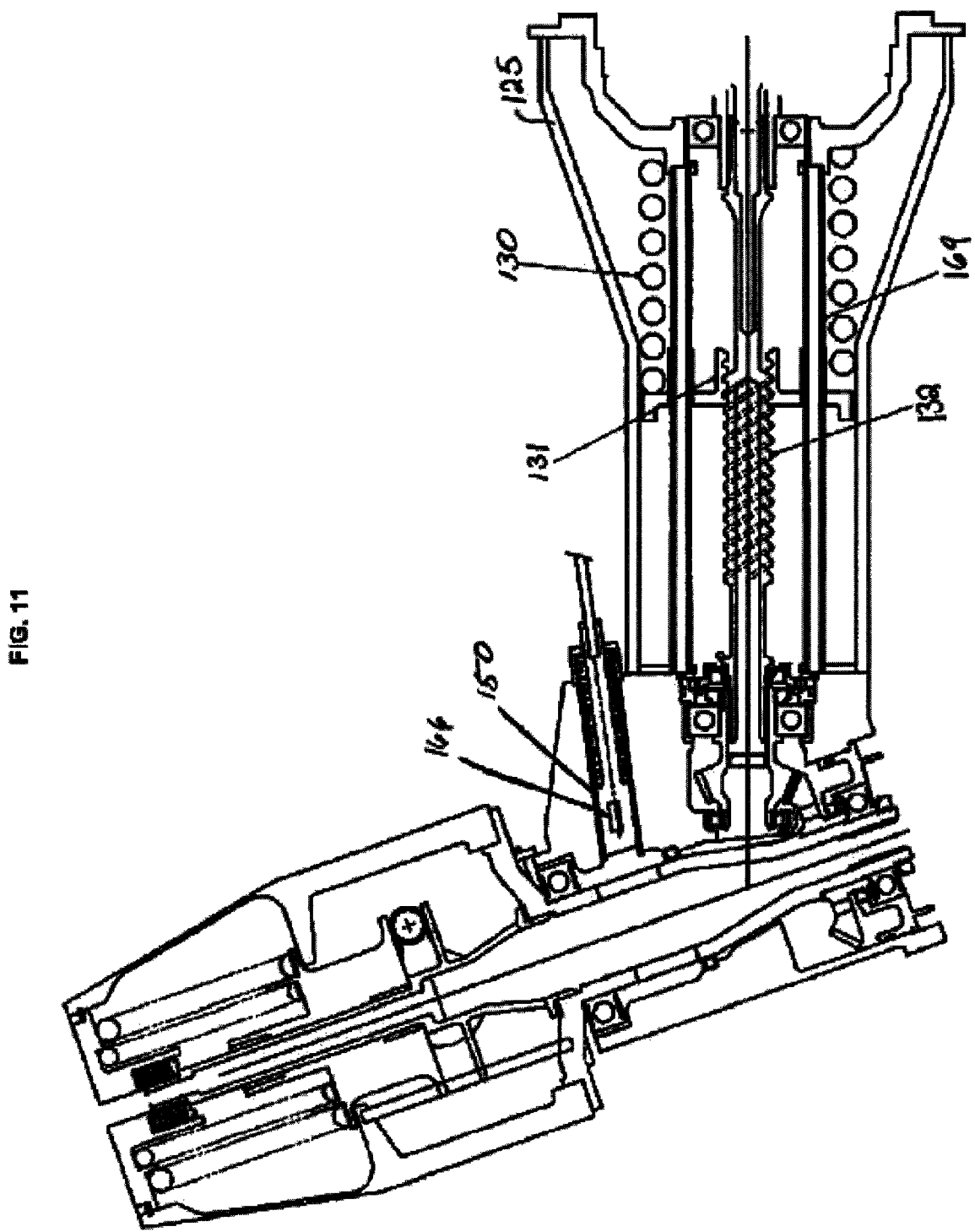
FIG. 11 is a side sectional view of the RAT of FIG. 9 in start up position with pre-loading applied.
Figure 12:
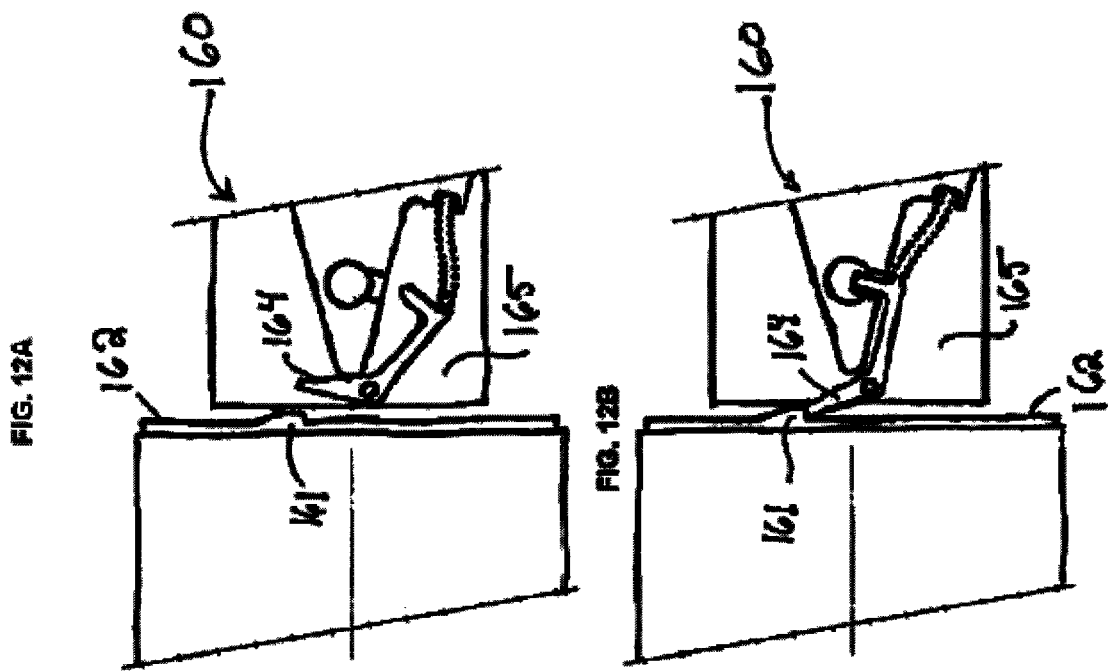
FIGS. 12A and 12B are enlarged views of a latching mechanism for the RAT of FIG. 9.

When an aircraft is on the ground, the mechanism must be reset prior to the next use. As shown in FIGS. 9 and 10, a hand operated lever 140 is provided to lift the nut 131 into position for engagement with the threads of the screw 132. By pushing down on the lever 140, an operator can cause the nut 131 to be lifted up against the bias of the compression spring 130 until contact between the nut 131 and the threads of the screw 132 is made. Then, the turbine blades are rotated in a first rotation direction and, with the blades being coupled to the nut 131, the first direction rotation of the blades causes the nut 131 to rotate about the screw 132 such that the compression spring 130 is compressed until the FIG. 11 position is obtained and the RAT 10 may be stowed into the aircraft. The turbine release plunger 150 moves during RAT 10 stowing into a slot in the turbine driveshaft to lock the compression spring 130 in the storage position.

With reference to FIGS. 12A and 12B, an optional ratchet mechanism 160 is shown and configured to prevent blade rotation if an operator inadvertently lets go of the blades during compression spring 130 wind up. Ratchet teeth 161 are located on the flange 162 of the turbine driveshaft and are clocked so that the turbine release plunger 150 can enter the corresponding slot in the turbine driveshaft with a ratchet pawl 164 engaged, making the finding of a right position easy. The ratchet pawl 164, which is disposed on the gearbox housing 165, is sized to inhibit a full spring and screw back-driving torque. A compression spring on the ratchet pawl 164 allows the ratchet pawl 164 to either ratchet on the teeth 161 or toggle to a safe position for operation. A tang on the ratchet pawl 164 engages with a ramped surface 166 on the turbine release pin 70. When the RAT 10 is stowed into the aircraft, the turbine release plunger 150 moves downward toward the turbine release shaft and the ramped surface of the turbine release pin 70 pushes the pawl tang out of its way to thereby disengage the ratchet pawl 164 from the tooth 161. The compression spring will toggle the ratchet pawl 164 further out of the way to avoid inadvertent clashes.

Figure 13:
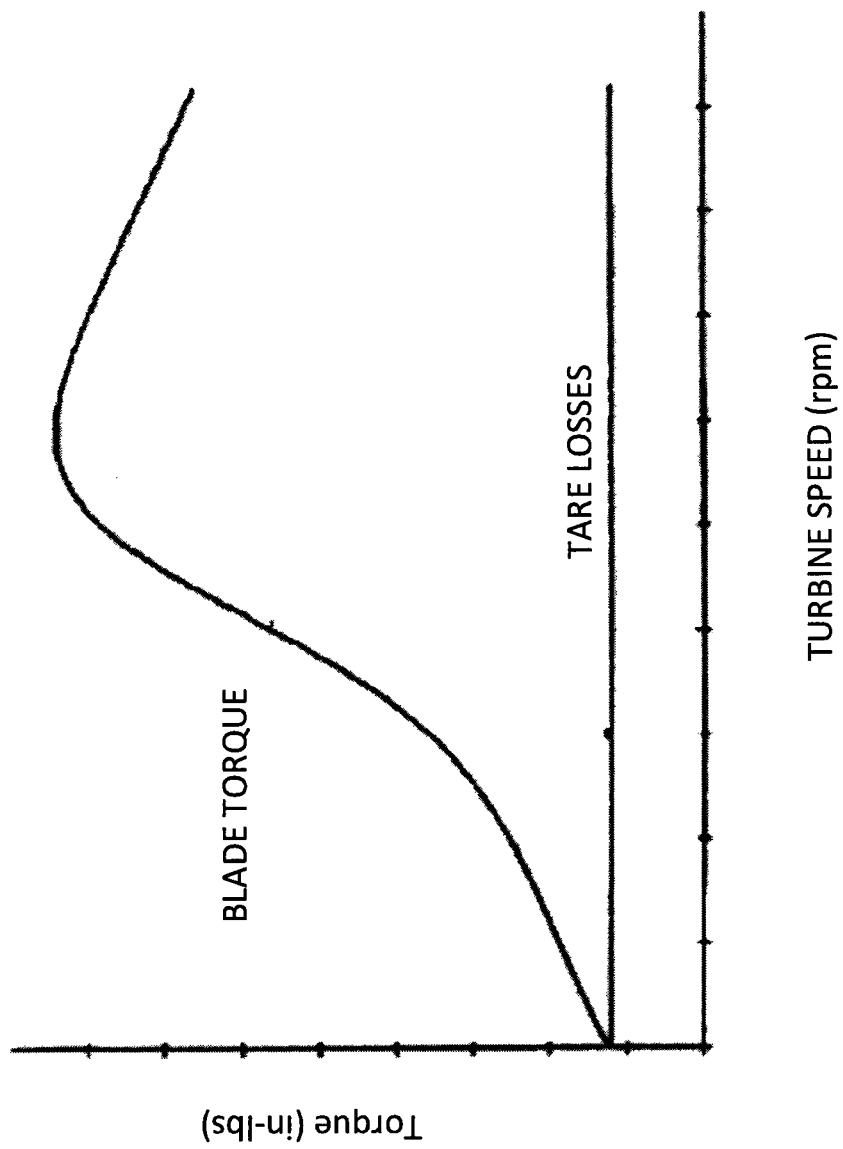
FIG. 13 is a graphical illustration of a fine pitch start up RAT torque vs. turbine speed showing a comparison of blade torque and tare losses.

When the RAT 10 is used, the stored energy of the compression spring 130 is used to augment the blade torque to overcome inertia and drag loads. An unassisted fine pitch RAT 10 may lug along for several seconds as it very slowly builds up speed. As shown in FIG. 13, the faster a fine pitch RAT spins, the more torque is available. The compression spring 130 and the nut 131 adds the most torque in the first few revolutions, where previously there was very little additional torque to speed the system up to overcome tare losses. So a spring assisted RAT will swiftly build up speed up to approximately 1000 RPM, where the spring energy is exhausted. Multiple start acme or square threads are required to minimize frictional losses in the screw thread. The blade torque has increased significantly with speed, so there is now adequate torque margin to continue a rapid acceleration.

When the compression spring 130 is fully extended (see FIG. 9), the rotating nut 131 disengages from the threading of the screw 132. Guide rods 169 keep the nut 131 centered to avoid contact with the rotating shaft of the RAT 10. A small residual spring load at the end of travel also keeps the nut 131 from moving.

Figure 14B:
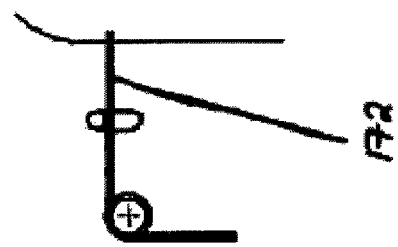
FIGS. 14A and 14B are side sectional views of an RAT start up assistance assembly according to alternate embodiments in a normal operation position.
Figure 14A:
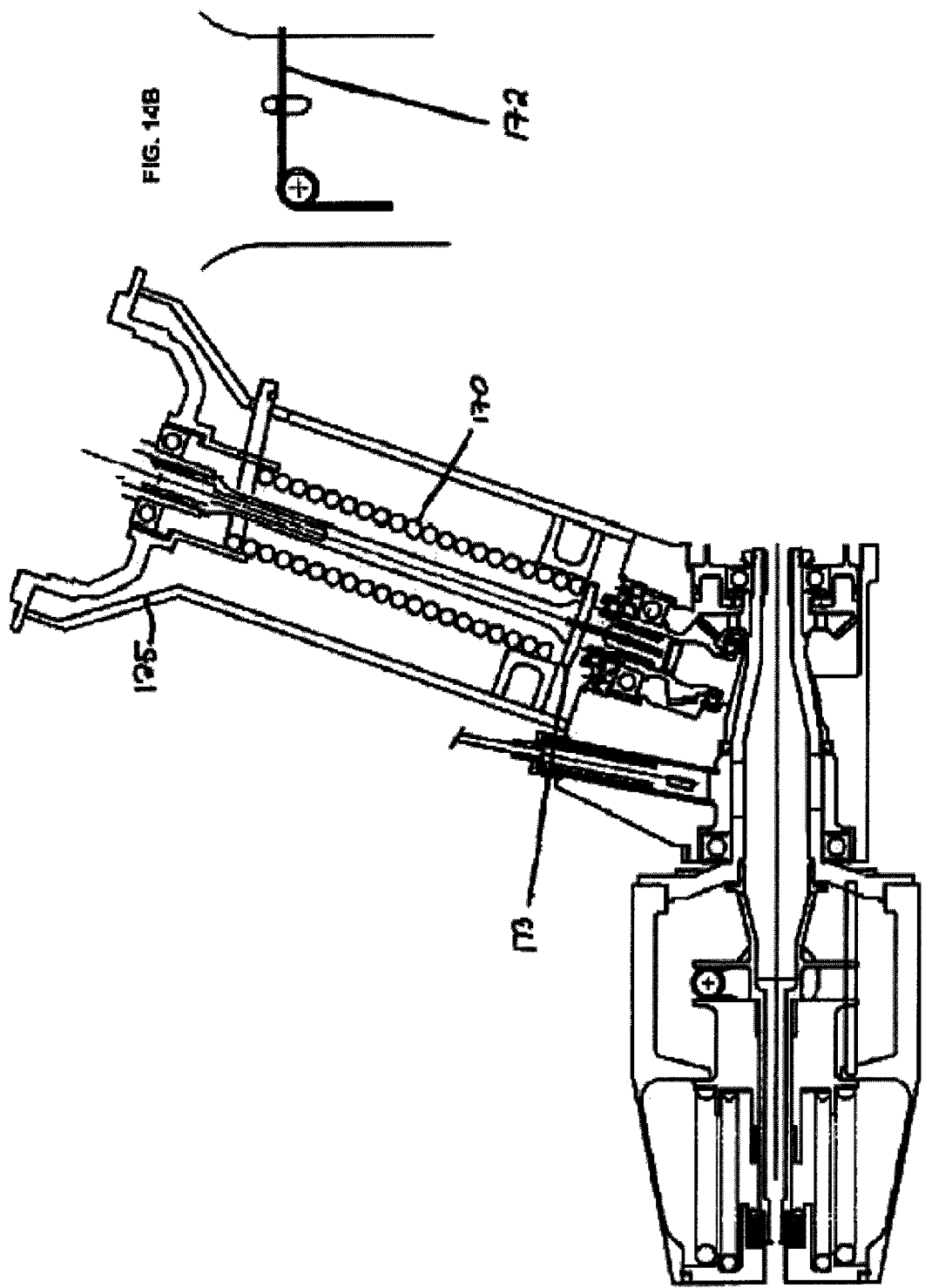

In accordance with further aspects of the invention and, with reference to FIGS. 14A and 14B, a torsion spring 170 has been added inside the strut 125 to assist with start up. FIG. 14A shows the components in their normal operating position after start up and, as shown in FIG. 14B, the reset spring 172 holds the torsion spring 170 up out of contact with the spring winding pin 173 so the RAT 10 functions the same as usual after the start sequence is over.

When the aircraft is on the ground, the mechanism must be reset prior to the next use. As shown in FIGS. 15A and 15B, by way of an operator pushing down on the reset spring 172, the torsion spring 170 may be allowed to move by gravity to the position shown. A small amount of turbine blade rotation opposite the usual rotation direction causes the spring winding pin 173 and pin end flat 173' to contact an end face of a last coil of the torsion spring 170. In FIG. 15C, a ledge 174, which is ground onto the spring end, ensures that the torsion spring 170 stays in contact so the reset spring 172 may be released, if desired. Further rotation of the turbine blades winds up the torsion spring 170 several revolutions to the storage position. Then, the RAT 10 may be stowed into the aircraft. The turbine release plunger 150 moves during RAT stowing into slot 71 in the turbine driveshaft to lock the torsion spring 170 in the storage position.

An optional ratchet mechanism similar to what is shown in FIGS. 12A and 12B may be provided here as well to prevent dangerous turbine blade rotation if the operator inadvertently lets go of the turbine blades during spring wind up.

In accordance with further aspects of the invention and, with reference to FIGS. 16A, 16B, 17A, 17B and 18, a cross-section of an RAT 10 and a gearbox in a start position is shown (FIGS. 16A and 16B), whereby the governor shaft 50 has been shifted towards the governor springs 51 (i.e., the left in the image) and latched into start up position by a latch pin 180. The governor shaft 50 movement causes the cam follower 60 and the turbine blades to rotate about the blade centerline toward a mid-range blade position. The coarser blade position develops significantly more torque at low RPMs to aid in starting up the turbine.

The latch pin 180 is configured with most of its mass located near the turbine hub 181 to develop centrifugal force more efficiently (best seen in the FIG. 16B). As the RAT 10 spins faster, the centrifugal force on the latch pin 180 becomes larger until it can overcome the friction between the latch pin 180 and a groove 183 (FIG. 18) of the governor shaft 50. At this time, the pin travels to the FIGS. 17A, 17B and 18 position at which the governor shaft 50 is released and it is pushed away from the latch pin 180 (i.e., to the right in the image) by the governor springs 51. This pushes the cam follower 60 and the turbine blades into the initial fine pitch position for normal governing.

Figure 18:
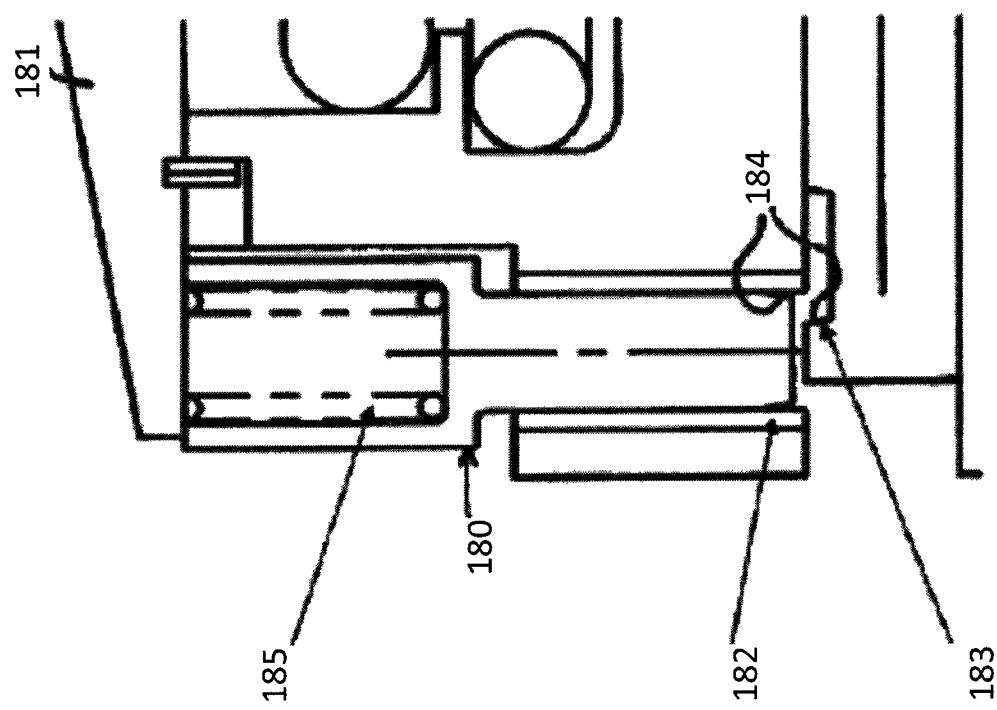
FIG. 18 is an enlarged view of a latch pin mechanism from FIG. 17.
Figure 19:
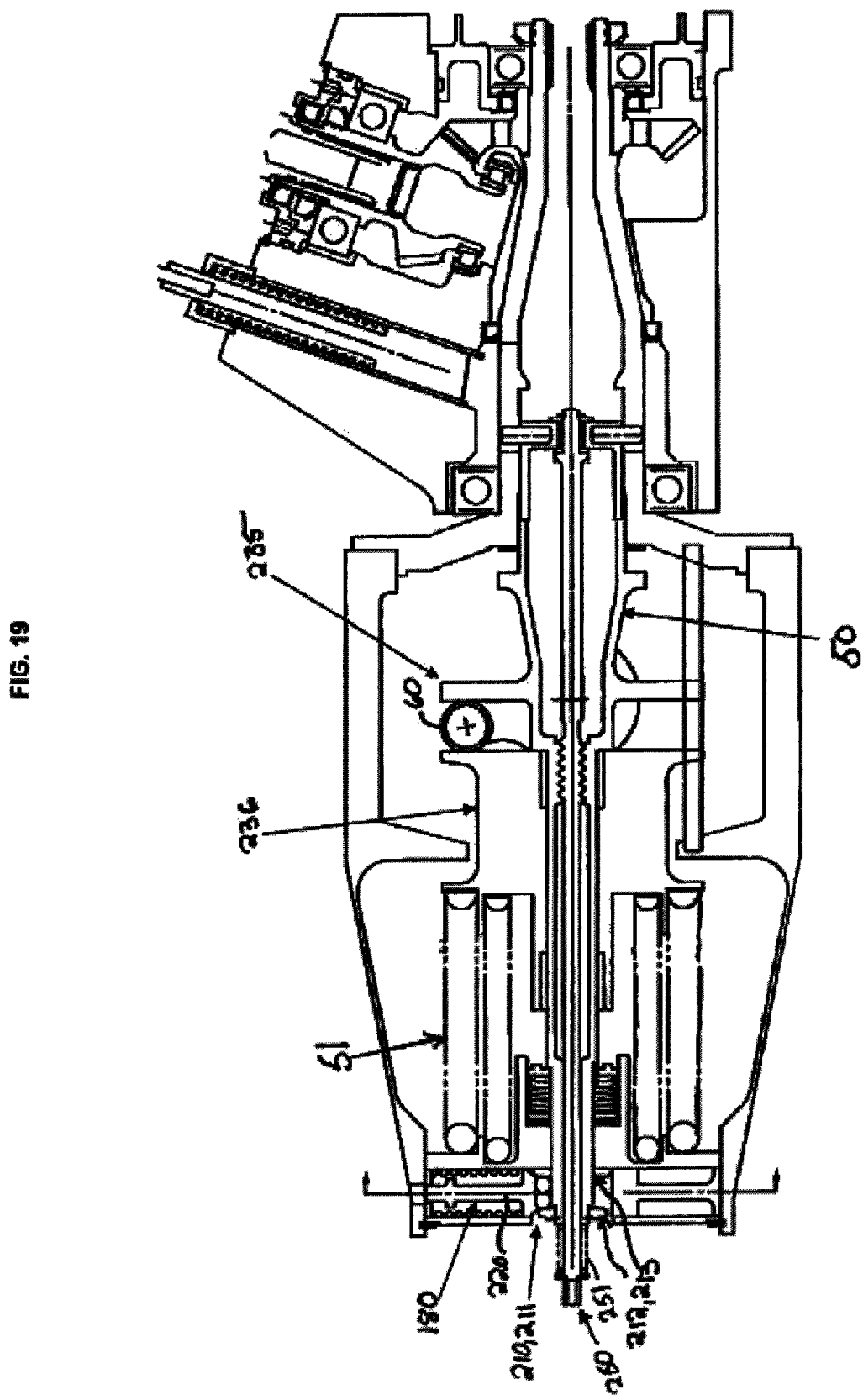
FIG. 19 is a side sectional view of an RAT in accordance with alternative embodiments to FIGS. 16A, 16B, 17A and 17B.

An enlarged view of the latch pin 180 mechanism is provided with reference to FIG. 18. As shown in FIG. 18, a tip 182 of the latch pin 180 and the groove 183 of the governor shaft 50 both have a slight taper 184 to reduce the effects of friction. A light reset spring 185 is included to push the latch pin 180 back into the groove 183 when the mechanism is reset. The latch pin 180 has its travel range restricted by contact with the turbine hub 181 so it rides at a known location during normal operation. A balance weight 186 of similar mass is located opposite the latch pin 180 to balance the centrifugal forces during normal operation (FIGS. 17A and B).

Friction occurs between the tip 182 of the latch pin 180 and the groove 183, and between the latch pin 180 and the bushing that surrounds it. The bushing may include some low friction material, such as Teflon, to minimize friction variation. A typical turbine may start to govern at 5000 RPM. The mass of the latch pin 180 would be selected to unlatch the mechanism between 2000 and 3000 RPM, including a wide variation in the coefficient of friction between the latch pin 180 and the groove 183. The latch mechanism can tolerate a wide variation in friction since the centrifugal force increases in a speed squared relationship. As the turbine approaches governing speed, the centrifugal force dominates the friction forces.

The latch pin 180 and the governor shaft 50 need to be made from fairly hard materials to avoid wear on the tip 182 and the groove 183. Galling between similar materials should also be prevented. Cold worked Nitronic 60 or beryllium copper may be chosen for a latch pin 180 that mates with a stainless steel governor shaft 50.

The mechanism is reset by moving the governor shaft 50 from the position of FIGS. 17A and 17B to the position of FIGS. 16A and 16B. A spring loaded reset pin 190 (not fully shown) is pressed by the operator into the slanted groove in the turbine driveshaft and the governor shaft 50. When the blades are rotated by hand, the groove 191 contacts the spring loaded reset pin 190 to push the governor shaft 50 toward the latch pin 180 (i.e., to the left in the image). The spring of latch pin 180 pushes the latch pin into the groove 183 to reset the mechanism. The spring on the spring loaded pin 190 retracts the spring loaded pin 190 out of the groove 191 when hand pressure is removed. The groove 191 should be clocked to make it impossible to insert the latch pin 180 into the turbine driveshaft if the spring loaded pin 190 is still engaged. Many other reset mechanisms may be used.

A plunger block pin 200 (FIGS. 17A and 17B) may also be included as a safety feature. The plunger block pin 200 allows the turbine release pin 70 to enter the slot in the latched position (FIGS. 16A and 16B) and blocks entry if the mechanism is not latched (FIGS. 17A and 17B). Many methods may be employed to provide this feature, such as a light spring inside the governor shaft, external bolts, a feature on the balance weight, etc.

In accordance with alternate and, with reference to FIGS. 19, 20A, 20B, 21, 22 and 23, friction in the latch mechanism may be reduced to allow more precise control of the blade transition RPM. As shown best in FIGS. 20A and 20B, the latch pin 180 may include rollers 210, 211 and a roller cage pin 220. The rollers 210, 211 each have rounded ends and are contained within a slot in the roller cage pin 220. The slot constrains the rollers 210, 211 to move outwardly within the roller cage pin 220 whenever the roller cage pin 220 moves outwardly. A spring 230 holds the roller cage pin 220 and the rollers 210, 211 down until the desired RPM is reached where centrifugal force overcomes the spring preload.

When the mechanism is latched (FIG. 19), the governor springs 51 push against the yokeplate 236 and the governor shaft 50, which loads across the rollers 210, 211 and thrust washers 212, 213. When the centrifugal force exceeds the spring preload, the roller cage pin 220 moves in the radially outward direction (i.e., the upwards direction in FIG. 21) and the rollers 210, 211 rotate in opposite directions (FIG. 21) as they roll out of the gap between the two thrust washers 212, 213. Since rolling occurs rather than sliding, the friction effects are negligible. When the rollers 210, 211 are out of the gap, the governor shaft 50 shifts away from the rollers 210, 211 (i.e., to the right in FIG. 22) to allow normal governed operation.

The spring preload and roller cage pin 220 mass are designed to permit blade transition within a predetermined narrow speed range. Since friction is minimized, the roller cage pin 220 mass is relatively light. This mechanism is significantly lighter than the traditional flyweight approach to coarse pitch startup. The governor shaft cam plate 235 may need some additional mass to withstand the impact forces applied to the cam follower 60 by the yokeplate 236 when the latch unlatches, but this is typical of a coarse pitch start mechanism.

Figure 22:
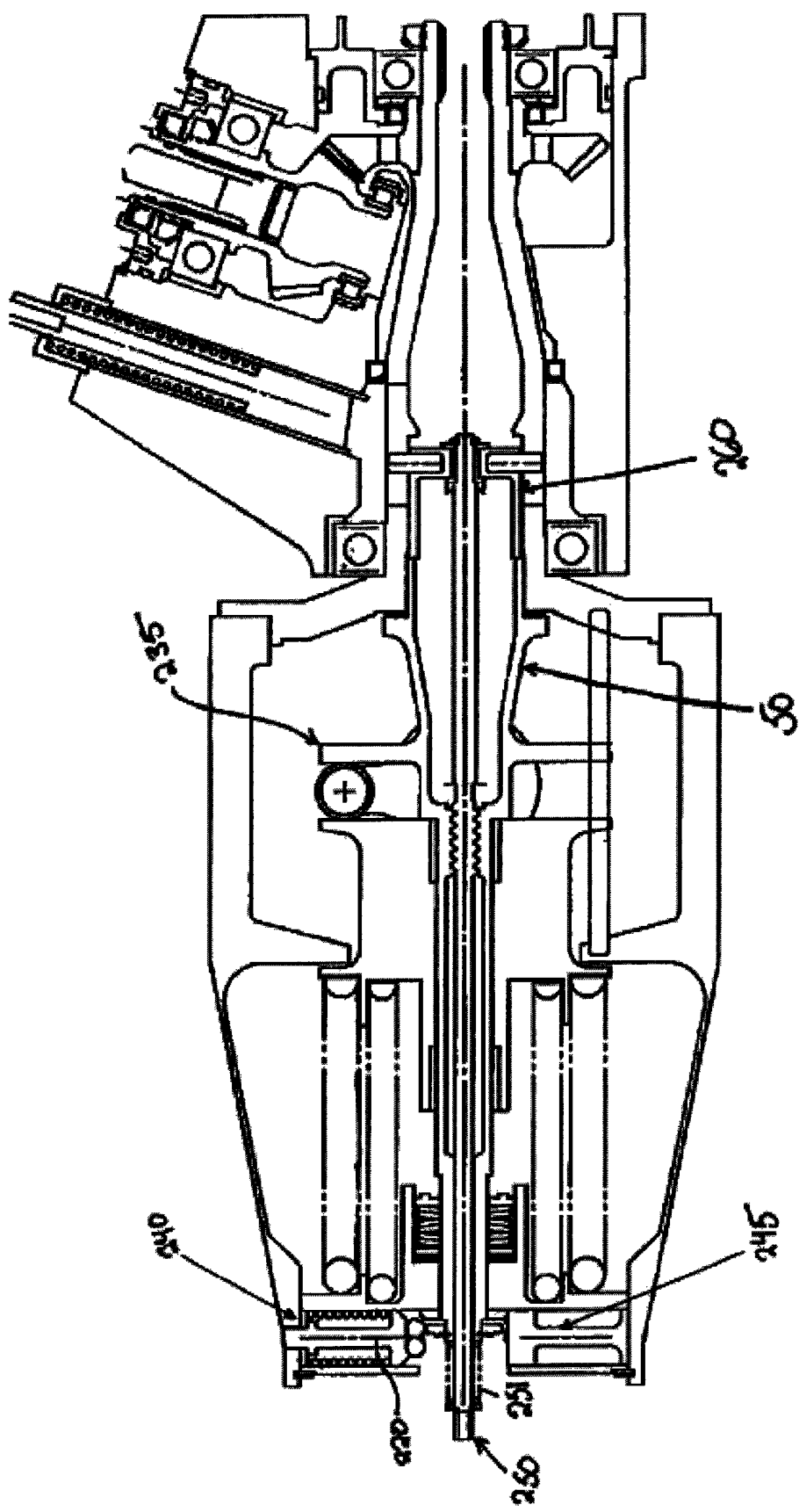
FIGS. 22 and 23 are normal operation and start up side sectional views of the RAT of FIG. 19.

With reference to FIGS. 20B and 22, a stop 240 on the roller cage pin 220 prevents over travel at high turbine speeds to prevent spring fatigue. A balance weight 245 is selected to counterbalance the roller cage pin 220, spring and rollers 210, 211 in their operating position.

The reset mechanism used with this embodiment could be the same as the previous embodiment. Alternatively, a reset screw could be used where threads of either the acme type or square type form a nut and screw arrangement between the reset shaft 250 and the governor shaft 50.

Figure 23:
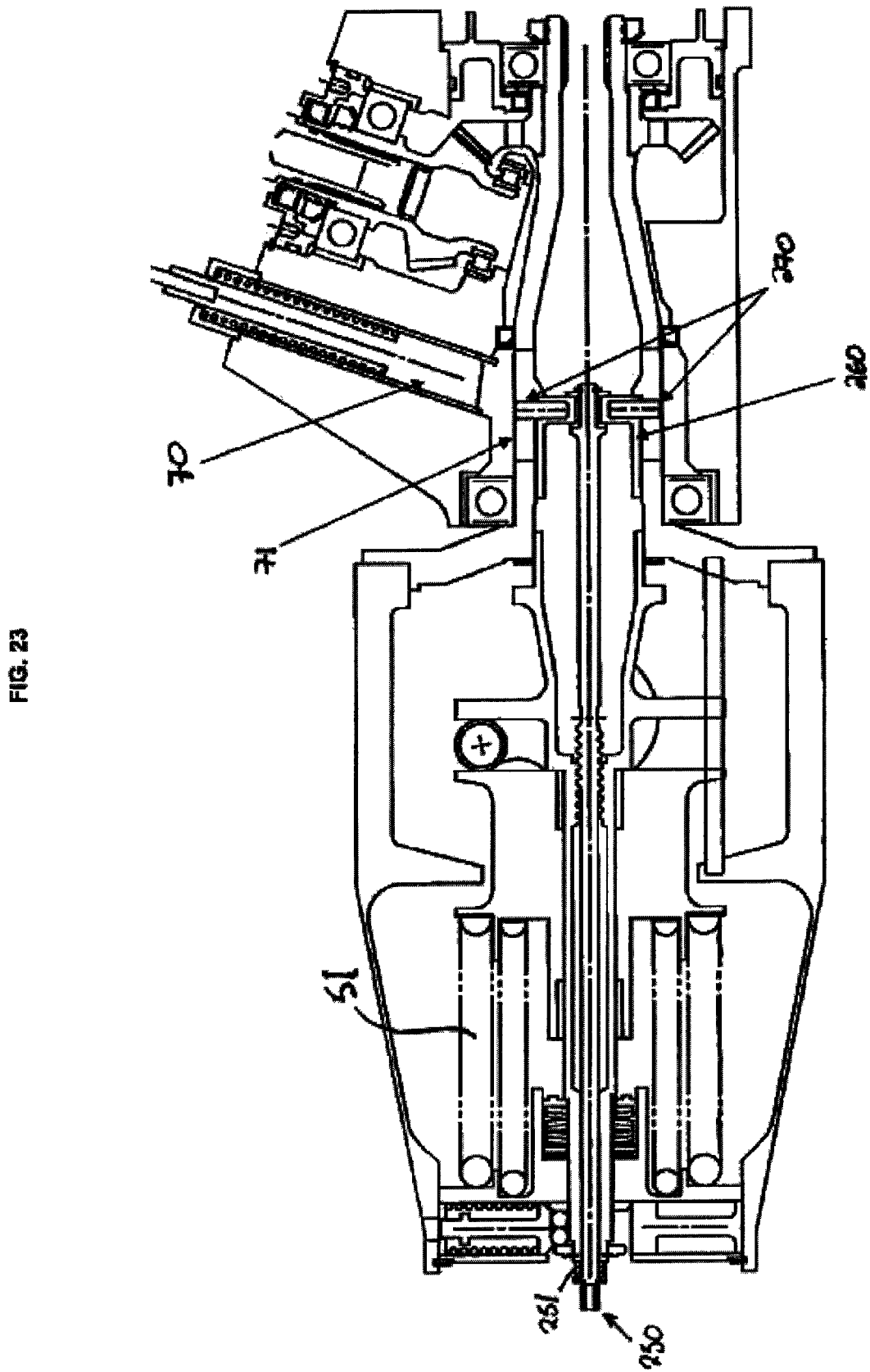

For example, with reference to FIG. 22, a reset shaft 250 may be rotated to first move the driveshaft slider 260 away from the roller cage pin 220 against a shoulder in the driveshaft. Continued rotation causes the governor shaft 50 to move toward the roller cage pin 220, compressing the governor springs 51. The spring on the roller cage pin 220 pushes the rollers 210, 211 into place to reset the mechanism to the FIG. 23 position. At this point, the setscrews 270 shown in FIG. 23 are in the path of the plunger, so the RAT 10 cannot be stowed. The reset shaft 250 is turned the other way to pull the driveshaft slider out of the plunger path in the correct FIG. 19 position to stow the RAT. So the setscrews 270 and slider make it impossible to accidentally stow the RAT 10 without resetting the turbine into the mid-range blade position and positioning the slider. A spring 251 on the reset shaft 250 holds the parts in place so they don't shift from vibration.

In accordance with another embodiment and with reference to FIG. 24A and 24B, a reset screw 280 may be threaded into the governor shaft 50 and tightened. The reset screw 280 pulls the governor shaft 50 toward it until a large enough gap opens between the thrust washers. Then the rollers 210, 211 and the roller cage pin 220 are pushed into the gap by the spring to reset the mechanism. A tag is affixed to the screw to remind the operator to remove the reset screw 280 prior to flight. Many other reset mechanisms may be envisioned to shift the governor shaft 50 back into position.

The nose of the turbine is only one location where a latch mechanism may be used to achieve mid-range blade startup. The latch pin may also be located within the turbine hub against the blade counterweight (alternate configuration not shown). The counterweight would be rotated toward coarse pitch, and restrained by the pin. Centrifugal force would lift the pin out of the way to allow for normal governing. If the pin became jammed, a location against the counterweight rather than in a hole in the counterweight allows limited governing and still precludes over speed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A startup assistance apparatus for a ram air turbine (RAT), the apparatus comprising:
   a shaft having threading over a partial length thereof;
   a nut disposed on the shaft to travel back and forth between a beginning of the partial length, an end of the partial length and a remote position remote from the partial length;
   an elastic element to bias the nut towards the remote position;
   a lever operably coupled to the nut to selectively move the nut from the remote position to the end of the partial length against the elastic element bias; and
   a system by which the nut provides the RAT with first direction blade rotation assistance while traveling from the beginning to the end of the partial length and second direction blade rotation of the RAT selectively moves the nut from the end to the beginning of the partial length against the elastic element bias.

2. The apparatus according to claim 1, wherein the lever comprises a hand operated lever.

3. The apparatus according to claim 1, wherein the second direction blade rotation is associated with manual blade rotation.

4. The apparatus according to claim 1, further comprising a ratchet mechanism to prevent first direction blade rotation as the nut moves from the end to the beginning of the partial length.

5. A startup assistance apparatus, comprising:
- a shaft;
- a nut disposed on the shaft to travel back and forth between a beginning of a partial length of the shaft, an end of the partial length and a remote position remote from the partial length, the nut being biased toward the remote position and selectively movable from the remote position to the end of the partial length against the bias;
- a system by which the nut provides a ram air turbine (RAT) with first direction blade rotation assistance while traveling from the beginning to the end of the partial length and second direction blade rotation of the RAT selectively moves the nut from the end to the beginning of the partial length against the bias; and
- a hand operated lever for selective movement of the nut.

6. The apparatus according to claim 5, wherein the second direction blade rotation is associated with manual blade rotation.

7. The apparatus according to claim 5, further comprising a ratchet mechanism to prevent first direction blade rotation as the nut moves from the end to the beginning of the partial length.

* * * * *